United States Patent
Li et al.

(10) Patent No.: US 11,899,253 B2
(45) Date of Patent: Feb. 13, 2024

(54) POLARIZATION SPLITTER AND ROTATOR

(71) Applicant: MACOM Technology Solutions Holdings, Inc., Lowell, MA (US)

(72) Inventors: Yunchu Li, Horseheads, NY (US); Austin G. Griffith, Ithaca, NY (US); Rich R. Grzybowski, Corning, NY (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 358 days.

(21) Appl. No.: 17/330,772

(22) Filed: May 26, 2021

(65) Prior Publication Data

US 2021/0278610 A1 Sep. 9, 2021

Related U.S. Application Data

(63) Continuation of application No. 16/580,824, filed on Sep. 24, 2019, now Pat. No. 11,048,052.

(51) Int. Cl.
*G02B 6/42* (2006.01)
*G02B 6/27* (2006.01)
(Continued)

(52) U.S. Cl.
CPC ........... *G02B 6/4213* (2013.01); *G02B 6/126* (2013.01); *G02B 6/1228* (2013.01);
(Continued)

(58) Field of Classification Search
CPC ... G02B 6/14; G02B 6/26; G02B 6/28; G02B 6/32; G02B 6/4213; G02B 6/126;
(Continued)

(56) References Cited

U.S. PATENT DOCUMENTS 9,791,761 B1 * 10/2017 Li .......................... G02F 1/025
11,048,052 B2 6/2021 Li
(Continued)

OTHER PUBLICATIONS

International Search Report and Written Opinion issued by the International Searching Authority, dated Feb. 4, 2021, for International Patent Application No. PCT/US2020/51902; 12 pages.

*Primary Examiner* — Michael P Mooney
(74) *Attorney, Agent, or Firm* — Faegre Drinker Biddle & Reath LLP

(57) ABSTRACT

Example polarization splitter and rotator devices are described. In one example, an optical apparatus includes a splitter configured to split a light signal into a first signal having a first polarization and a second signal having a second polarization, a polarization rotator configured to rotate the second polarization of the second signal into a third polarization, and a polarization mode converter configured to convert the third polarization of the second signal into the first polarization. In certain aspects of the embodiments, the splitter can be a curved multi-mode inference (MMI) polarization splitter, and the polarization rotator comprises input and output ports, with the output port being wider than the input port. The polarization mode converter can be an asymmetrical waveguide taper mode converter. The devices described herein can overcome the deficiencies of conventional devices and provide low insertion loss, flat and/or wide wavelength response, high fabrication tolerance, and compact size.

6 Claims, 30 Drawing Sheets

(51) Int. Cl.
*G02B 6/122* (2006.01)
*G02B 6/126* (2006.01)
*H04B 10/50* (2013.01)
*G02F 1/01* (2006.01)
*G02F 1/025* (2006.01)

(52) U.S. Cl.
CPC ......... *G02B 6/2726* (2013.01); *G02B 6/2766* (2013.01); *G02B 6/2773* (2013.01); *G02F 1/01* (2013.01); *H04B 10/50* (2013.01); *G02F 1/025* (2013.01)

(58) Field of Classification Search
CPC .............. G02B 6/12107; G02B 6/1228; G02B 6/12014; G02B 6/272; G02B 6/2726; G02B 6/2746; G02B 6/2766; G02B 6/2773; G02B 27/283; G02B 27/286; H04B 10/50; G02F 1/01; G02F 1/025
See application file for complete search history.

(56) References Cited

U.S. PATENT DOCUMENTS

| | | |
|---|---|---|
| 2007/0223939 A1 | 9/2007 | Arimoto |
| 2016/0246005 A1 | 8/2016 | Liu |
| 2016/0377812 A1 | 12/2016 | Ma |
| 2020/0067626 A1 | 2/2020 | Dupuis |

\* cited by examiner

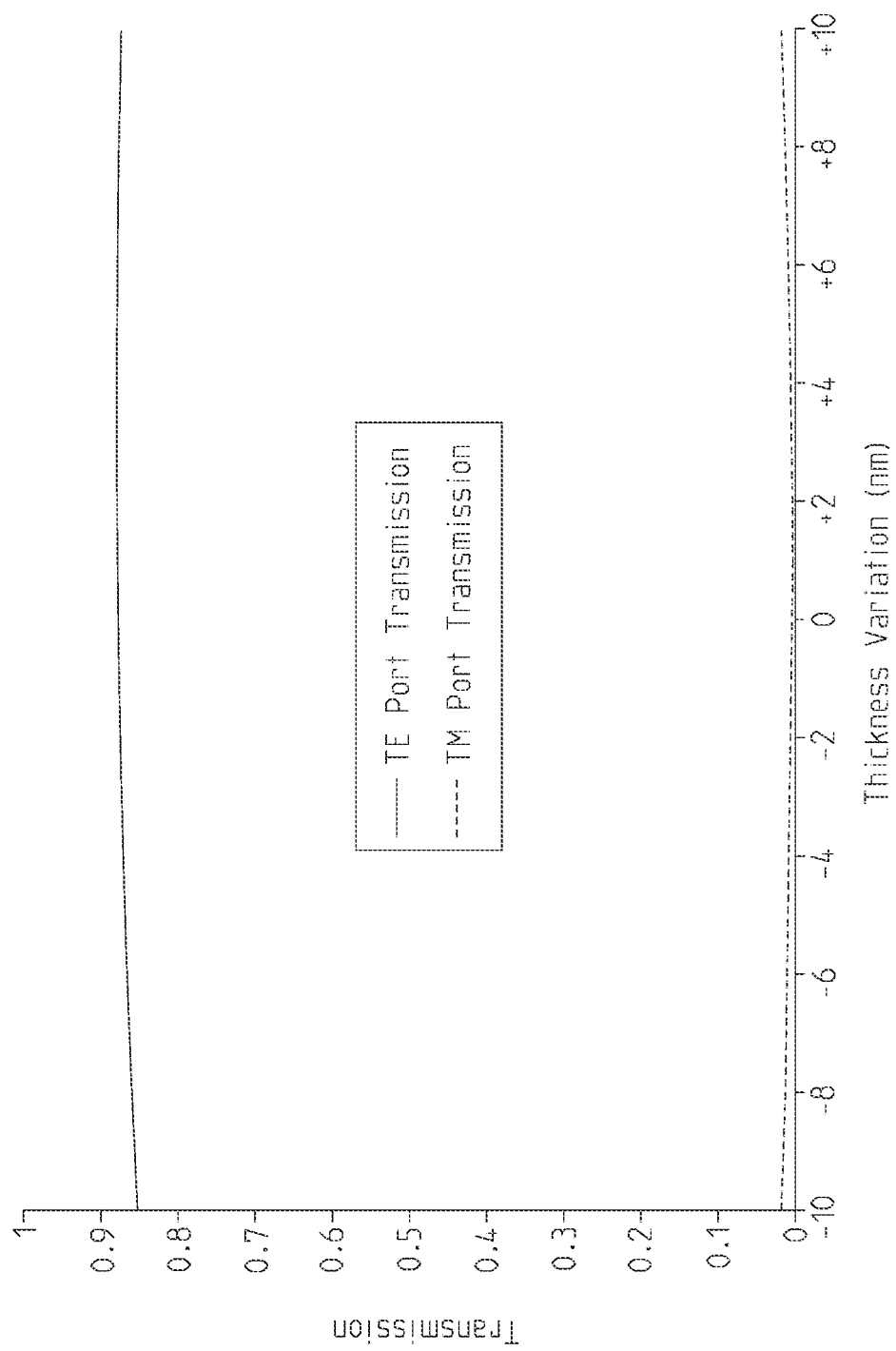

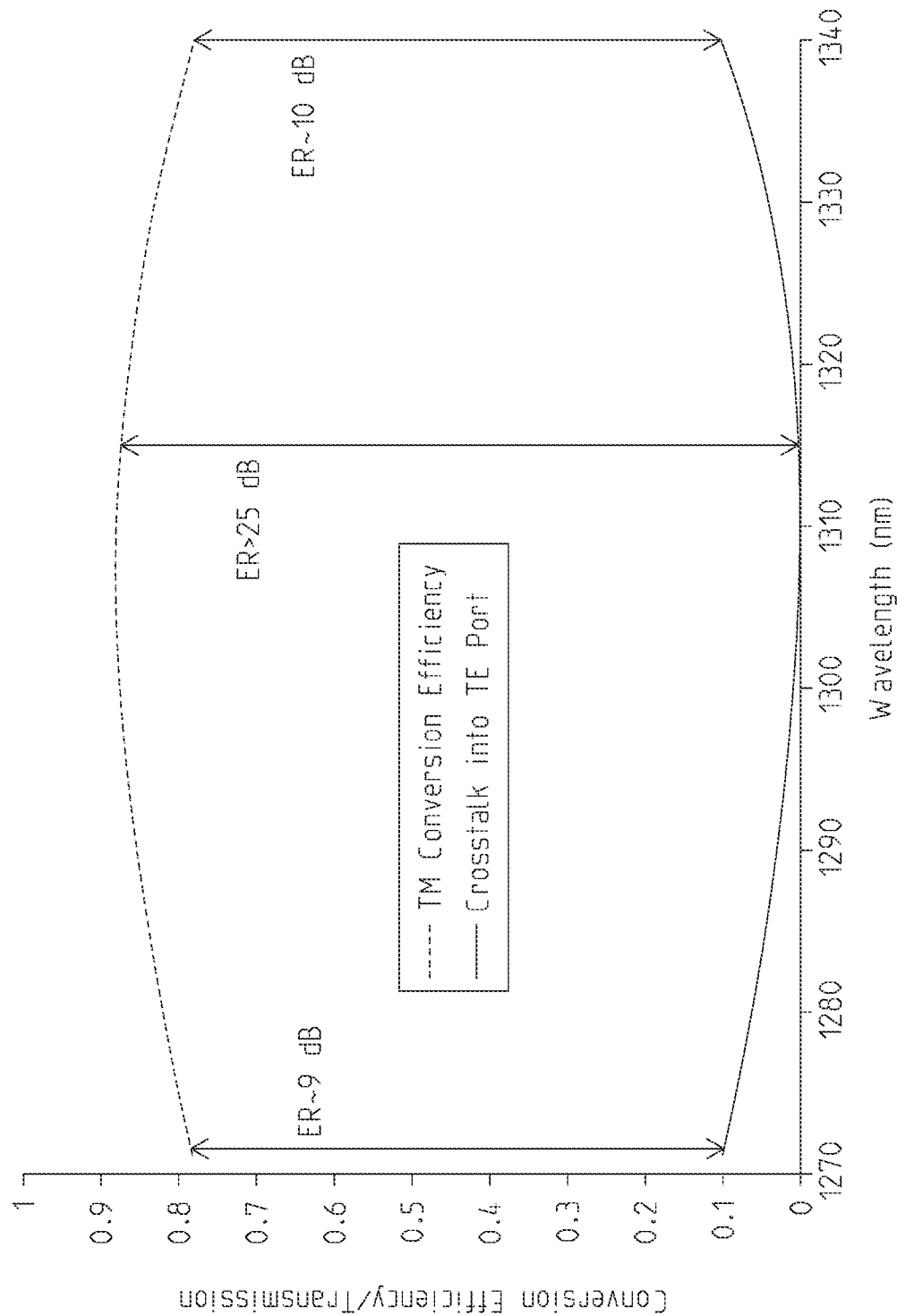

US 11,899,253 B2

POLARIZATION SPLITTER AND ROTATOR

RELATED APPLICATION

This application is a continuation application of U.S. patent application Ser. No. 16/580,824, titled POLARIZATION SPLITTER AND ROTATOR, filed Sep. 24, 2019, the entire disclosure of which is expressly incorporated by reference herein.

FIELD OF THE DISCLOSURE

The present disclosure generally relates to optical waveguide devices, and more particularly, to optical waveguide devices that employ polarization splitters.

BACKGROUND OF THE DISCLOSURE

A polarization splitter and rotator (PSR) can be a passive device used in integrated optics, such as a data transmitter or receiver (e.g., a transceiver). For example, a PSR may use dual polarization division multiplexing (DPDM) to double the bandwidth of a transceiver. A PSR may also be used to build polarization insensitive receivers, which can detect signals transmitted in optical single mode fibers.

When a light signal is input into a waveguide of a photonic integrated circuit (PIC), polarization of the light signal may be known based upon the input circuitry. However, when a light signal is received by a receiver, polarization of the light signal may be unknown. Indeed, the polarization may be a random polarization or an unknown transverse-electric (TE), transverse-magnetic (TM), or TE/TM polarization. Therefore, a PSR may use directional couplers to split a light signal into TE and TM polarizations and to rotate the light into a known TE state so that data can be retrieved from the light signal.

However, conventional PSRs may suffer from a narrow wavelength response, high insertion loss, sensitivity to fabrication error, and a large size. The coupling ratio of directional couplers may be wavelength sensitive and it may be difficult to obtain a flat wavelength response. Moreover, associated polarization rotators and mode converters may be relatively large in size and exhibit optical attenuation.

FIG. 1 shows a conventional PSR 100. PSR 100 may include a directional-coupler-based polarization splitter 110, a bi-level taper-based $TM_0$-to-$TE_1$ polarization rotator 120, and an asymmetric Mach-Zehnder-Interferometer (MZI) based $TE_1$-to-$TE_0$ mode converter 130. Light signals having both $TE_0$ (i.e., zero order TE mode) and $TM_0$ (i.e., zero order TM mode) polarizations may be input via input port 101. For the $TE_0$ input, $TE_0$ polarized light may travel to thru-port 111 directly. For the $TM_0$ input, $TM_0$ polarized light may be coupled to cross-port 112 and then gradually converted to a $TE_1$ (i.e., first order TE mode) polarization mode when traveling through polarization rotator 120, which may provide a bi-level taper. The output $TE_1$ polarization mode may then be split into two $TE_0$ mode beams by converter 130, which may also introduce an extra phase difference of 7 between the two beams and then phase align the beams so they can be converted into a $TE_0$ polarization mode output from converter 130.

FIG. 2 shows another example of a conventional PSR 200. The operation sequence in this example is polarization rotation, splitting, and mode conversion. $TE_0$/$TM_0$ mixed polarization light may be input at input port 201. As the input light propagates through a taper waveguide polarization rotator 210, $TM_0$ mode light may be converted to $TE_1$ mode light, while the $TE_0$ mode light maintains unchanged. The $TE_1$ and $TE_0$ modes may then be input into a mode splitter and rotator 220 at input 211, and then separated into two beams by the mode splitter and rotator 220. Mode splitter and rotator 220 may be a Y-junction, directional coupler, or MZI interferometer, for example. The $TE_0$ mode light may be output at through port 221. The $TE_1$ mode light may be converted to the $TE_0$ mode using mode transition or mode interference in the mode splitter and rotator 220 and output at cross port 222.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIGS. 5A-5D show waveguide thickness variation versus transmission in accordance with some embodiments of the present disclosure.

FIGS. 10A-10E show PSR performance in accordance with some embodiments of the present disclosure.

DETAILED DESCRIPTION OF EMBODIMENTS

The present disclosure and the related advantages are described and highlighted in the following description and accompanying figures which are not necessarily drawn to scale. Detailed descriptions of structure and processing techniques are omitted so as to not unnecessarily obscure the present disclosure. Further, in the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details. Further, certain features, which are well known in the art, are not described in detail in order to avoid complication of the disclosed subject matter. In addition, it will be understood that the examples provided below are exemplary and other systems and methods are within the scope of the disclosed subject matter.

Figure 1:
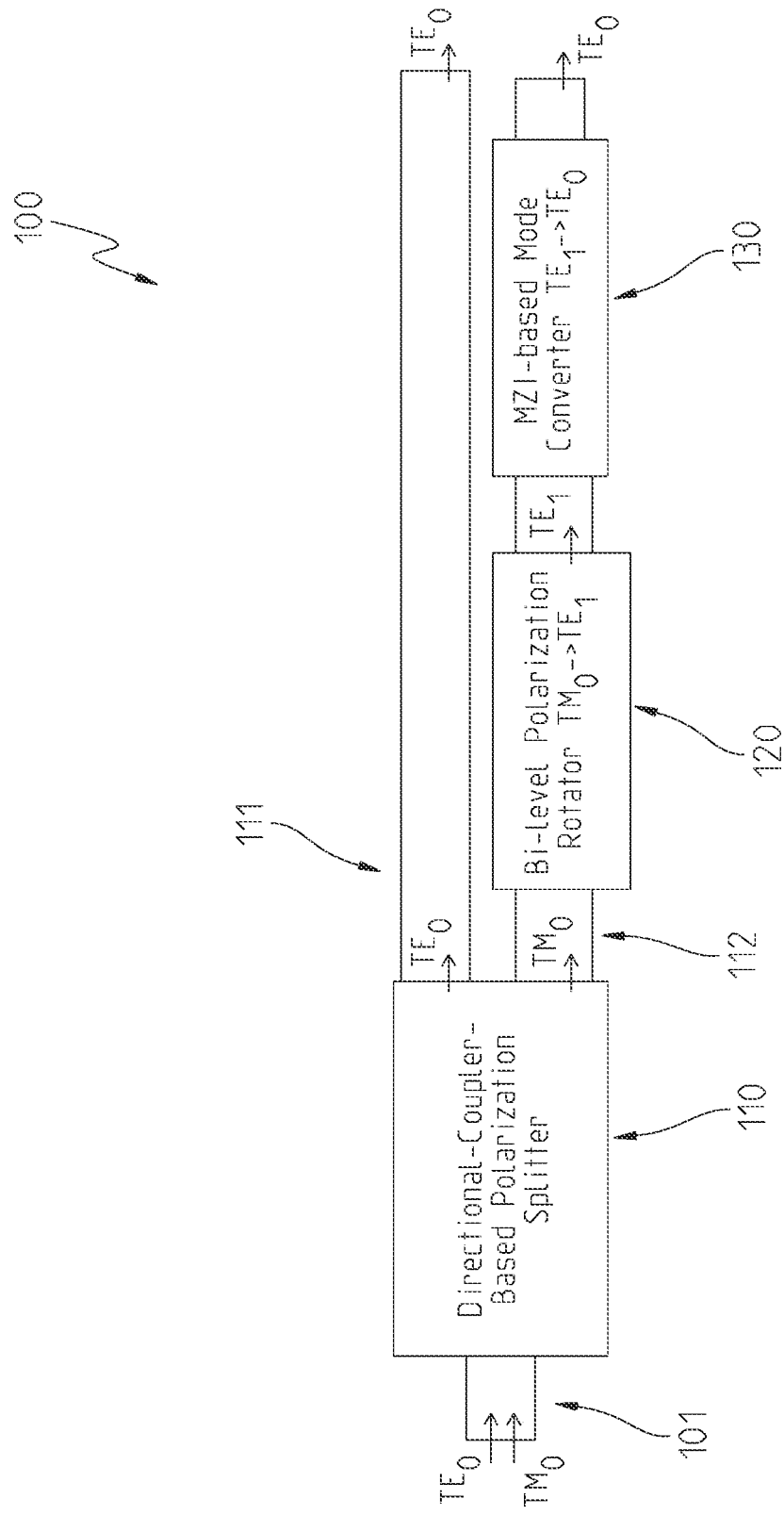
FIG. 1 shows an exemplary conventional PSR according to one example of the present disclosure.
Figure 2:
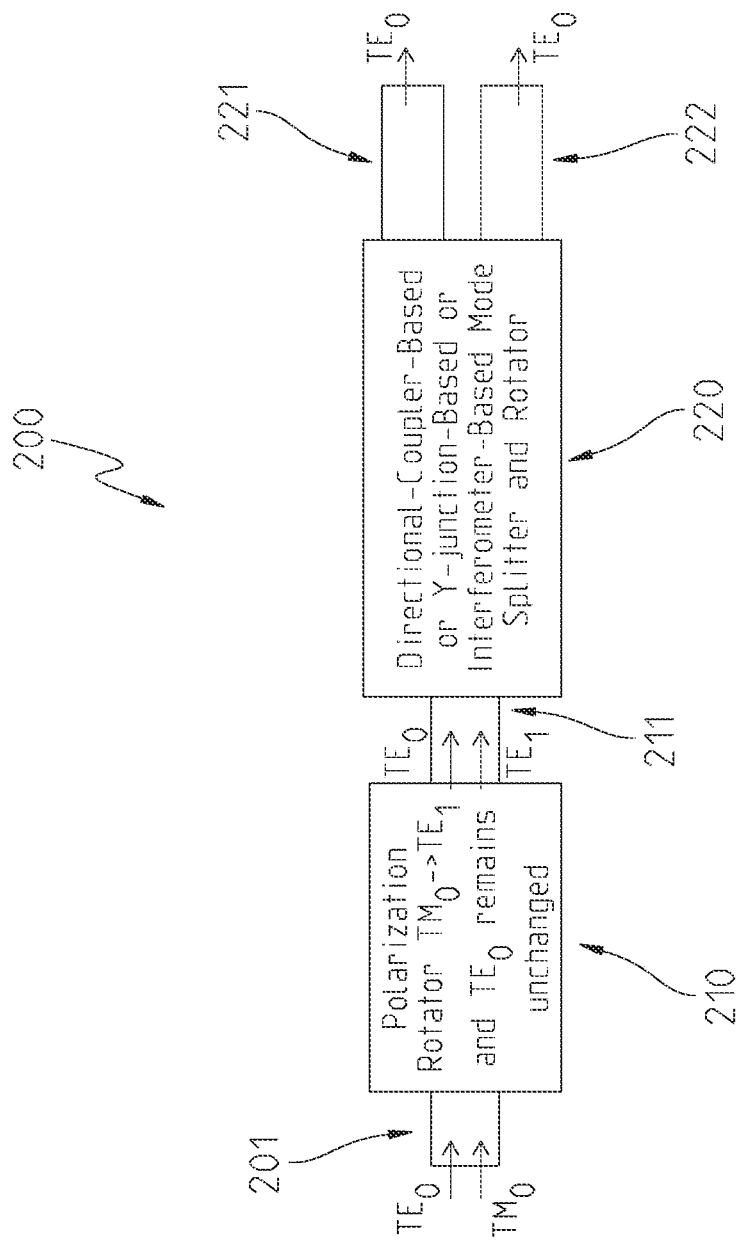
FIG. 2 shows another exemplary conventional PSR according to one example of the present disclosure.

As discussed above, the conventional PSRs 100 and 200 of FIGS. 1 and 2 may suffer from drawbacks. For example, both may exhibit a small (e.g., 1 decibel (dB)) bandwidth, where the wavelength range of the bandwidth has an optical loss variation of less than 1 dB, for example, and may be 30 to 40 nanometers (nm), for example. Also, both the PSRs 100 and 200 may have relatively high insertion loss (e.g., 1.5 to 2.5 dB) and sensitivity to fabrication errors. In addition, in order to work properly, the PSRs 100 and 200 may have to mix the $TE_0/TM_0$ mode light beams, instead of processing them independently, which can make dual polarization division multiplexing (DPDM) difficult.

Therefore, there may be a need for PSRs that overcome the deficiencies of conventional devices, and that may include, for example, low insertion loss (e.g., less than 1 dB), flat and/or wide wavelength response, high fabrication tolerance, and compact size. Such advances may be applicable to photonic transceivers, for example, among other related devices.

Compared to conventional systems, the embodiments of the present disclosure achieve various improvements. First, embodiments of the present disclosure may use an MMI-based polarization splitter rather than directional coupler-based splitters, which may achieve a flatter wavelength response and improved fabrication tolerance. Second, the MMI splitter may not be a straight MMI or a quadratic-curve MMI, but may be a particle-swam-optimized MMI, which may achieve low loss, have a compact size, have a large 1 dB bandwidth, and have acceptable fabrication tolerance—all simultaneously. Third, embodiments of the present disclosure may employ an asymmetrical waveguide taper to replace an interferometer-based mode converter, which may improve fabrication tolerance and reduce optical loss. Embodiments of the present disclosure may provide improved performance that is better than conventional PSRs. Embodiments of the present disclosure may be relevant to optical receiver and transceivers, such as coherent transceivers, among other optical communications devices.

Figure 3:
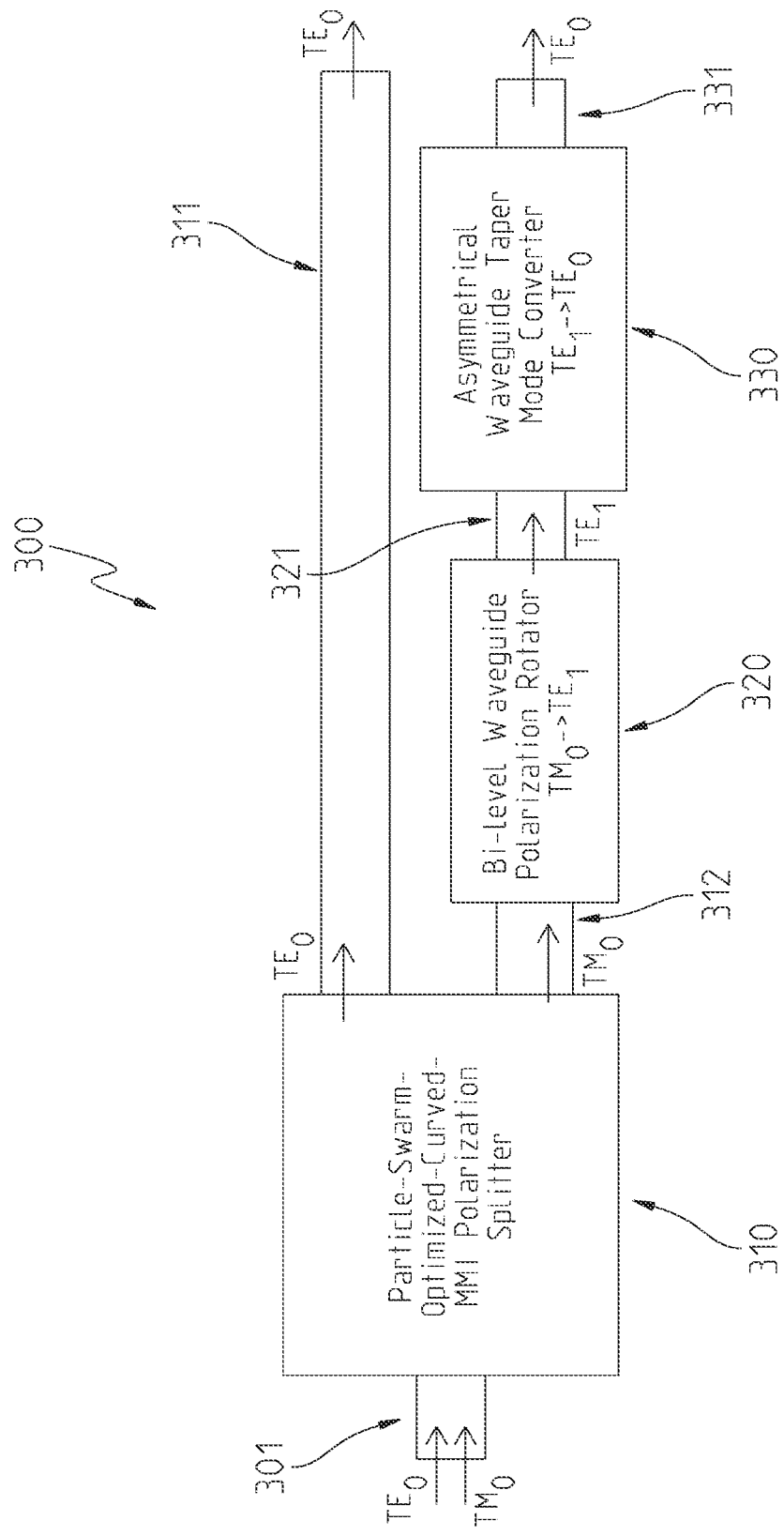
FIG. 3 shows an integrated optical apparatus in accordance with some embodiments of the present disclosure.

FIG. 3 shows an integrated optical apparatus 300 in accordance with some embodiments of the present disclosure. Optical apparatus 300 is a PSR and includes a particle swarm optimized curved multi-mode-interference (MMI) polarization splitter 310, a bi-level waveguide polarization rotator 320, and an asymmetric waveguide taper mode order converter 330. The incoming light signal at input 301 may be an unknown mix of $TE_0$ and $TM_0$ polarized light. The MMI polarization splitter 310 splits the $TE_0$ mode light from the $TM_0$ mode light and outputs them separately at through port 311 and cross port 312. The bi-level-waveguide-based polarization rotator 320 rotates the $TM_0$ mode light into $TE_1$ mode light, which is input into asymmetrical waveguide taper mode converter 330 at input 321. Asymmetrical waveguide taper mode converter 330 further transfers the $TE_1$ mode light into $TE_0$ mode light, which is output at port 331. Thus, two $TE_0$ mode light beams may be output (one at port 311 and the other at port 331), and each of the beams is independent of each other. The output light may be received by one or more receivers, such as a receiving photodetector. In some embodiments, the one or more receivers may include a diversity receiver.

As described in further detail below, the MMI-based polarization splitter 310 may be less wavelength-sensitive and more fabrication tolerant compared to conventional splitters. The MMI-based polarization splitter 310 may exhibit a flat spectrum bandwidth in its output signals. In one example, the MMI-based polarization splitter 310 is fabricated on a silicon layer and covered with silicon dioxide cladding. The silicon layer can be 220 nm thick. Below the silicon layer is a buried oxide (BOX) layer. The BOX layer can be about 2 micron (μm) thick. To enable a 1 dB transmission bandwidth that is greater than 70 nm, the width of the MMI-based polarization splitter 310 may be made as small as possible. However, the left and right edge of the MMI-based polarization splitter 310 may be sized wide enough to accommodate two 420 nm wide waveguides, as well as a waveguide gap larger than 300 nm. The MMI-based polarization splitter 310 can include a curved rib layer of the 220 nm thick silicon. Besides the rib layer, no other silicon layer with a different thickness is used.

Figure 4A:
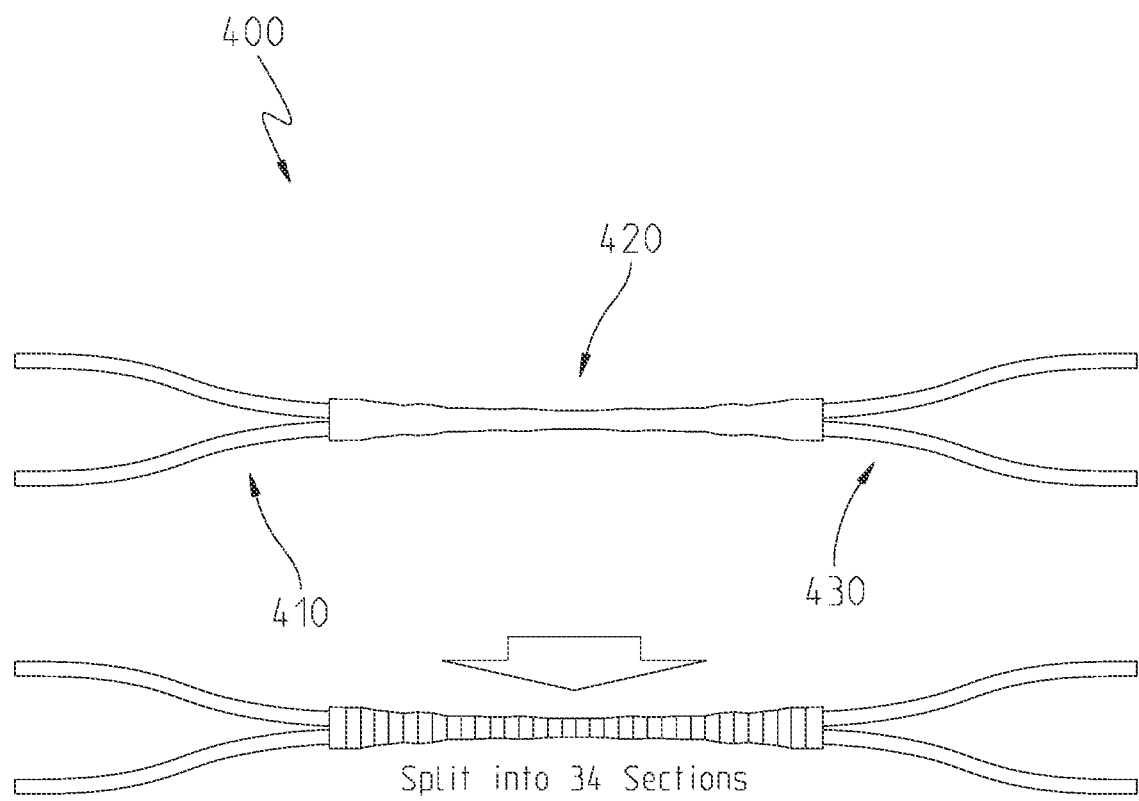
FIGS. 4A-4E show diagrams associated with a polarization splitter in accordance with some embodiments of the present disclosure.

FIG. 4A shows an example structure 400 of the MMI-based polarization splitter 310 shown in FIG. 3. The structure 400 includes input waveguides 410, an MMI polarization splitter 420, and output waveguides 430. In FIG. 4A, the incoming light signal at one of the input waveguides 410 may be an unknown mix of $TE_0$ and $TM_0$ polarized light. The MMI polarization splitter 420 splits the $TE_0$ mode light from the $TM_0$ mode light and outputs them separately at the output waveguides 430, which correspond to ports 311 and 312 in FIG. 3. In one example, the MMI polarization splitter 420 can include a curved rib layer of 220 nm thick silicon. The MMI polarization splitter 420 can be split into a number of sections, such as 34 sections, as also shown in FIG. 4A and described in additional detail below.

Other MMI designs including curves have been based on exponential or quadratic curves. Those designs tend to violate the adiabatic criterion and bring significant optical loss. Although employing adiabatic criterion could help minimize the loss, it potentially leads to bulky dimensions. For an ideal polarization splitter, compact size, large extinction ratio, high fabrication tolerance, and a broad 1 dB bandwidth are also highly desired. Unfortunately, these figures of merit have not been typically considered in curved MMI designs. Hence, the traditional exponential or quadratic curve MMIs are not suitable. There are tradeoffs associated with polarization splitters, such as the competing interests of low insertion loss and flat wavelength response. Another competing interest is high fabrication tolerance and compact size. The polarization splitters of the present disclosure exhibit compact size, a relatively high fabrication tolerance, a large 1 dB bandwidth, a high extinction ratio, and a low insertion loss, all simultaneously. Numerical optimization can be relied upon to consider these trade-offs and reach a final optimal design according to the embodiments described herein. The Particle Swarm Optimization (PSO) method, for example, can be relied upon, setting all design parameters as variables.

In one example, the MMI polarization splitter 420 may use a curvy MMI coupler that may be divided into a plurality of sections. For example, the curvy MMI coupler may be divided into 34 sections, as shown in FIG. 4A. The width of each section, as well as the position of the input and/or output waveguides may be adjusted and optimized using the PSO method. The PSO method can be relied upon to assess all the design variables, review different designs, calculate the above-mentioned figures of merit of the designs, compare the results, and choose the best design, in one iteration. Then, the next iteration will be done by referring to the results of the previous iteration to further improve the design. After hundreds of iterations, the optimal MIMI polarization splitter design can be reached.

Figure 4B:
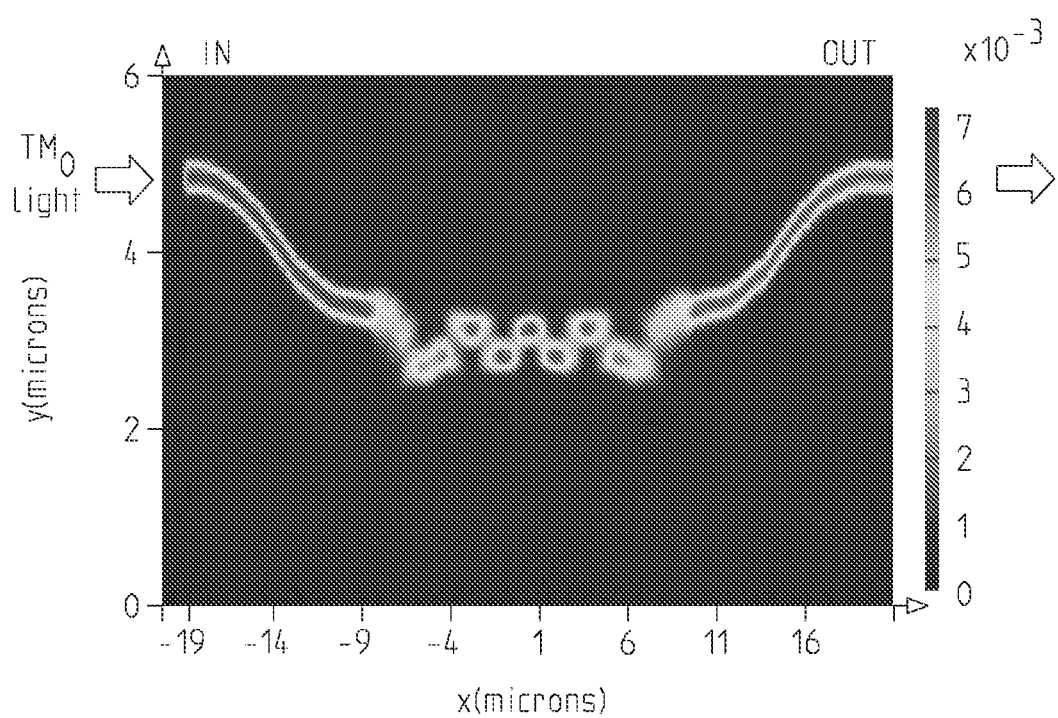

The design of the MIMI polarization splitter 420 can also be optimized in simulation, such as through simulation using the 3D FDTD software tool of Lumerical, Inc. of Vancouver, British Columbia, Canada. FIGS. 4B and 4D show the optical power propagation of $TE_0$ and $TM_0$ light in the simulation area based on FDTD simulation results. In FIGS. 4B and 4D, the X axis stands for the coordinates in propagation direction and Y axis stands for the coordinates vertical to the propagation direction in the simulation area. By observing FIGS. 4B and 4D, it is possible to see how the power of the $TE_0$ and $TM_0$ mode light has split. As shown in the FDTD diagram in FIGS. 4B and 4D, the $TM_0$ mode light was successfully split from the $TE_0$ mode light, into upper and lower branches of the output waveguides 430, respectively. The polarization-mixed incoming signals are input from the upper input waveguide 410 into the MMI polarization splitter 420. The $TE_0$ mode light is output in the right-bottom branch of the output waveguides 430, and the $TM_0$ mode light is output in the right-top branch of the output waveguides 430.

Figure 4C:
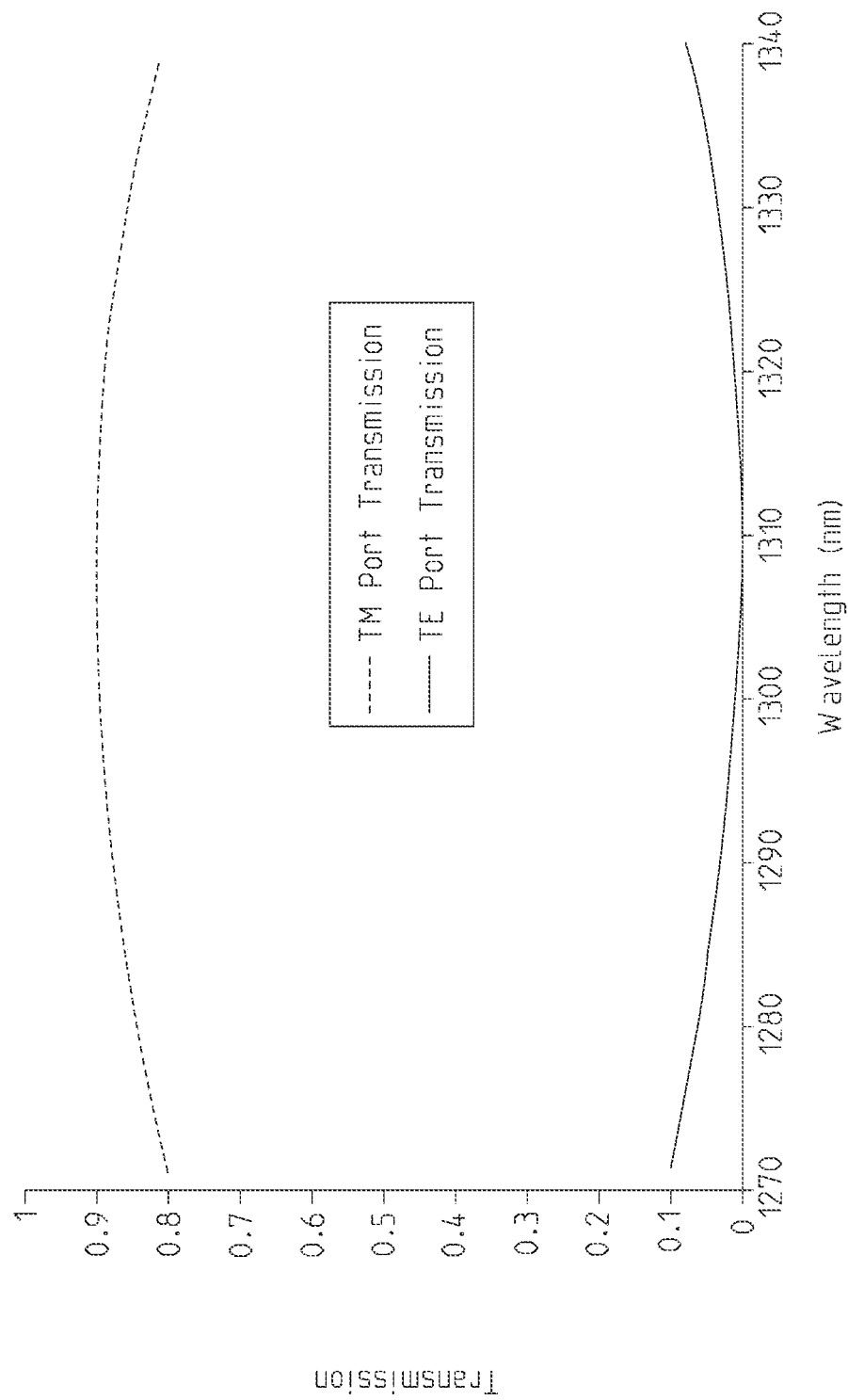
Figure 4D:
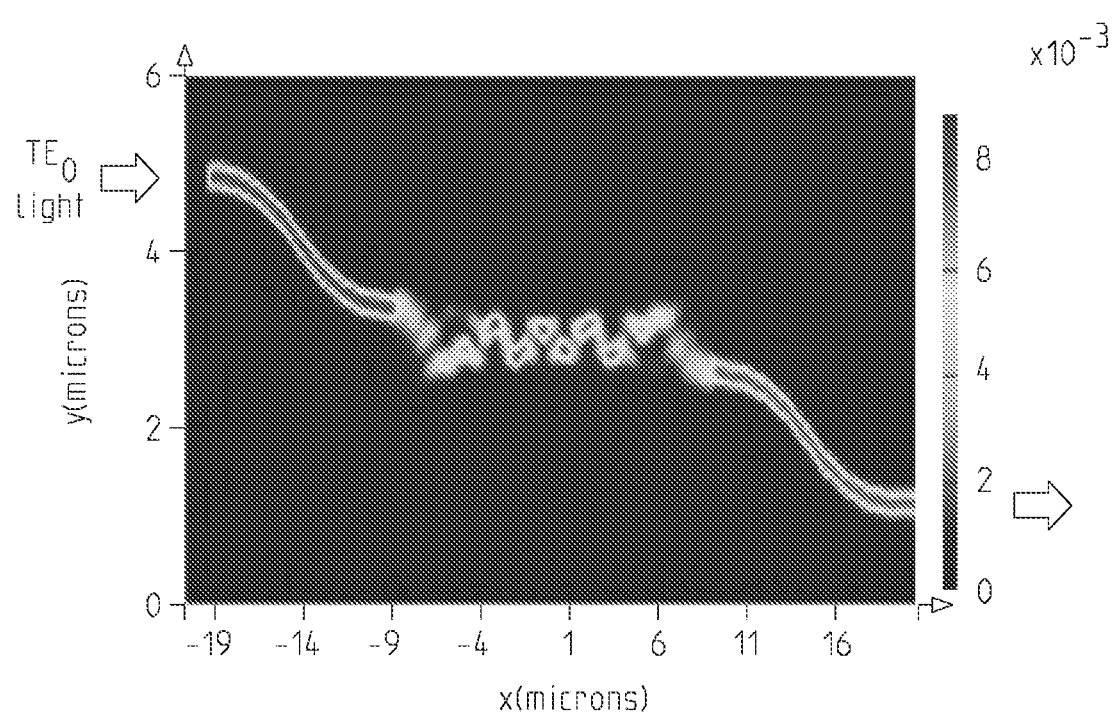
Figure 4E:
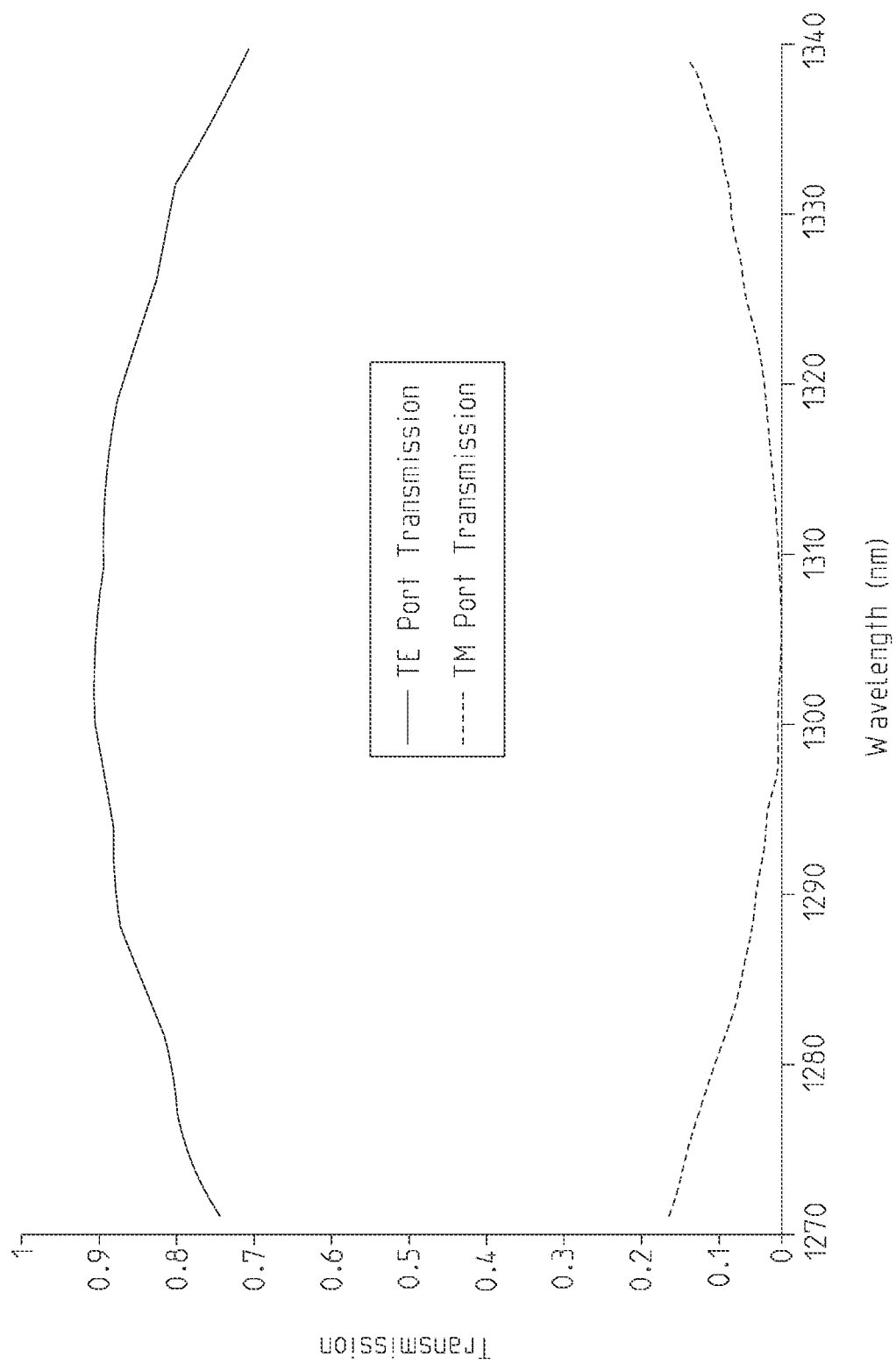

FIGS. 4C and 4E show the calculated optical transmission rate of the $TM_0$ and $TE_0$ mode light, respectively, corresponding to the diagrams of FIG. 4B and FIG. 4D. The optical transmission was measured from 1270 to 1340 nm with a step of 0.1 nm by using the power monitor in the FDTD software tool. By inputting the $TE_0$ and $TM_0$ light at the upper input waveguide 410 and reading the transmission of $TE_0$ and $TM_0$ light at the lower and upper branches of the output waveguide 430, it is possible to calculate how much the optical loss and extinction ratios is for the $TE_0$ and $TM_0$ mode light quantitatively. In FIG. 4C, the X axis stands for the wavelength in nm, and the Y axis stands for the absolute transmission rate (e.g., 0.9 means 90%). For example, the extinction ratio for both $TE_0$ and $TM_0$ at 1310 nm is greater than 20 dB, and the insertion loss is only 0.45 dB (i.e., 90.17%). The 1 dB bandwidth is far larger than 70 nm. In some embodiments, the MMI polarization splitter 310 may be sized at or about 17.12 μm long and at or about 1.5 μm wide. The FIG. 4 diagrams may correspond to such a sized design.

Figure 5A:
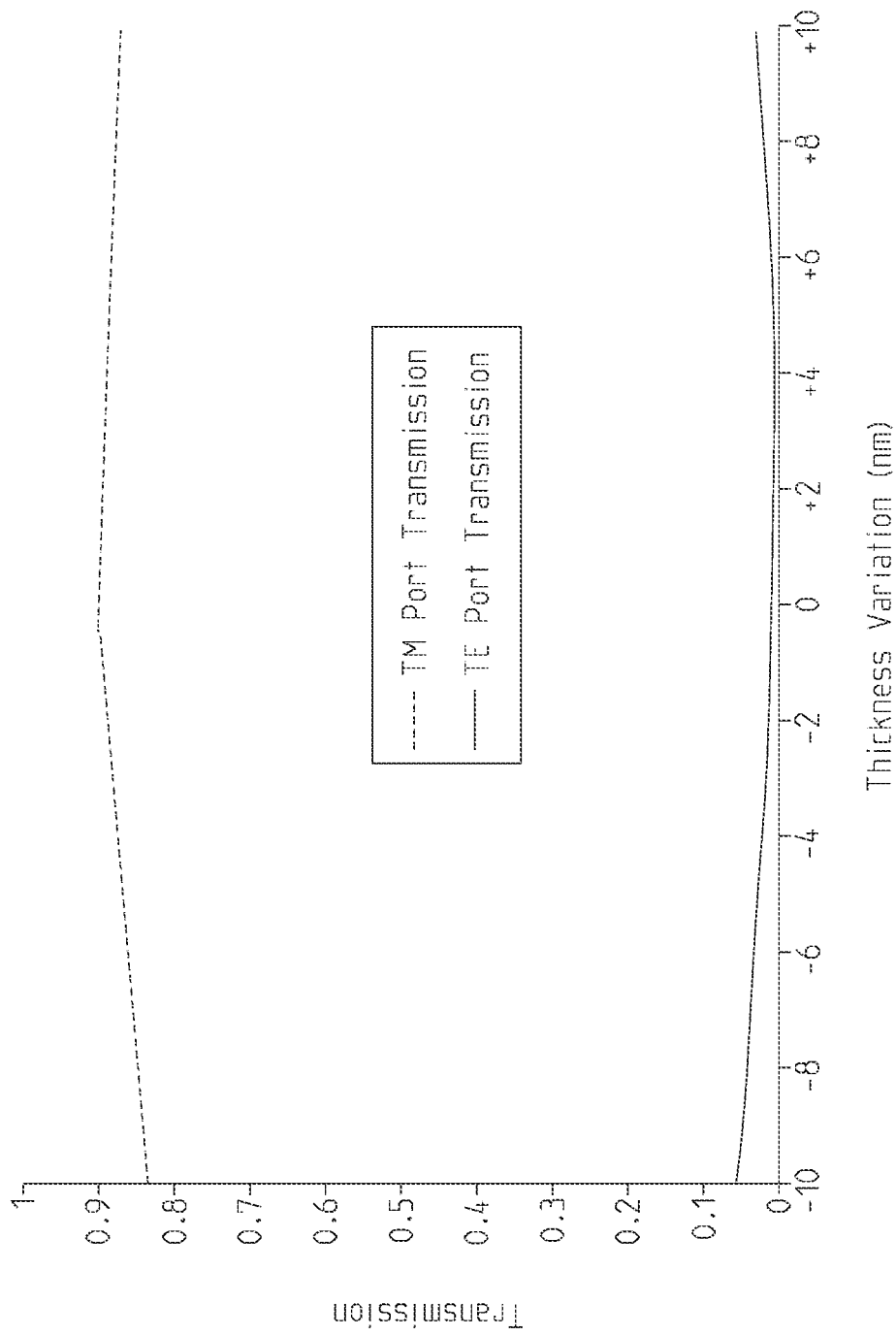
Figure 5C:
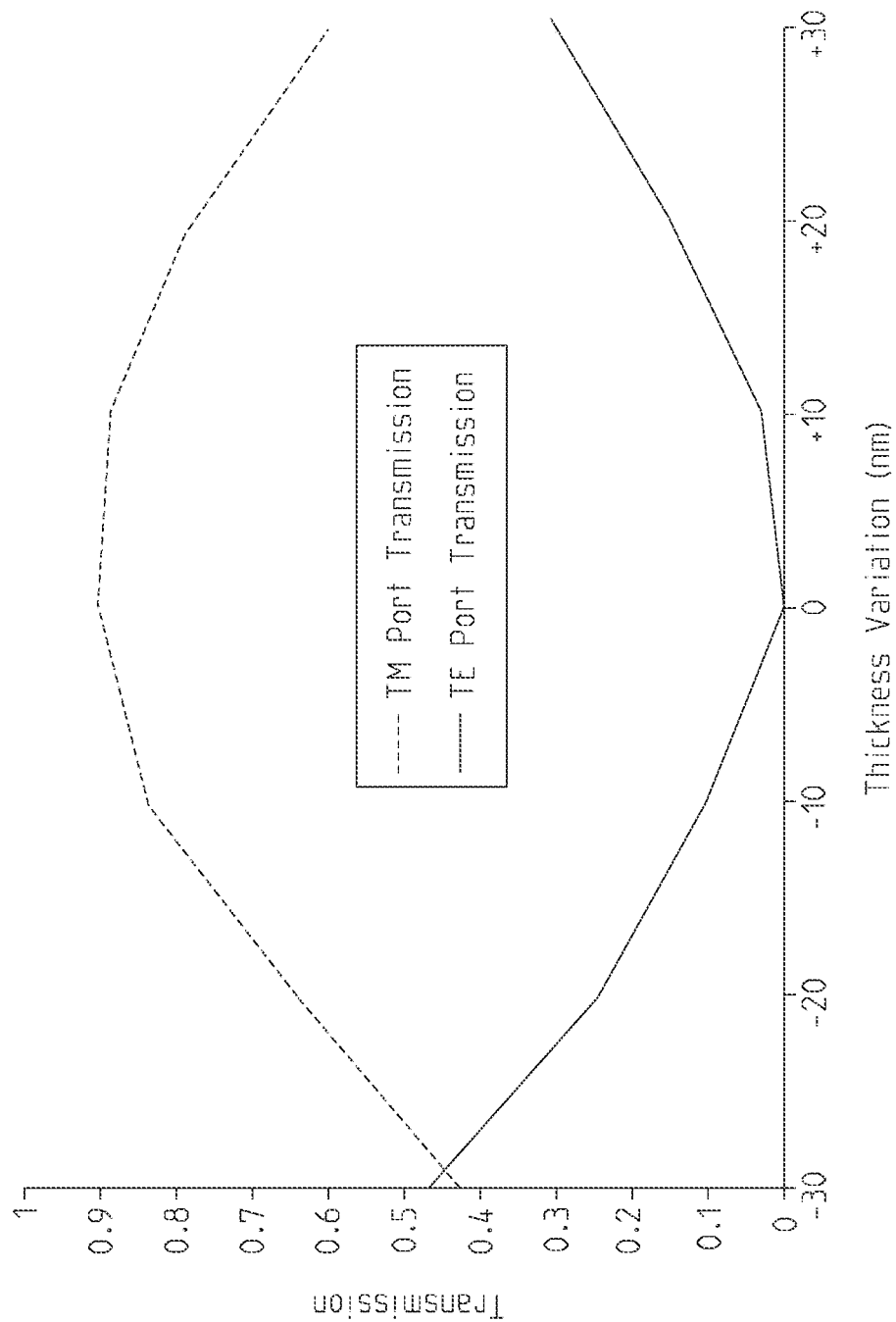
Figure 5D:
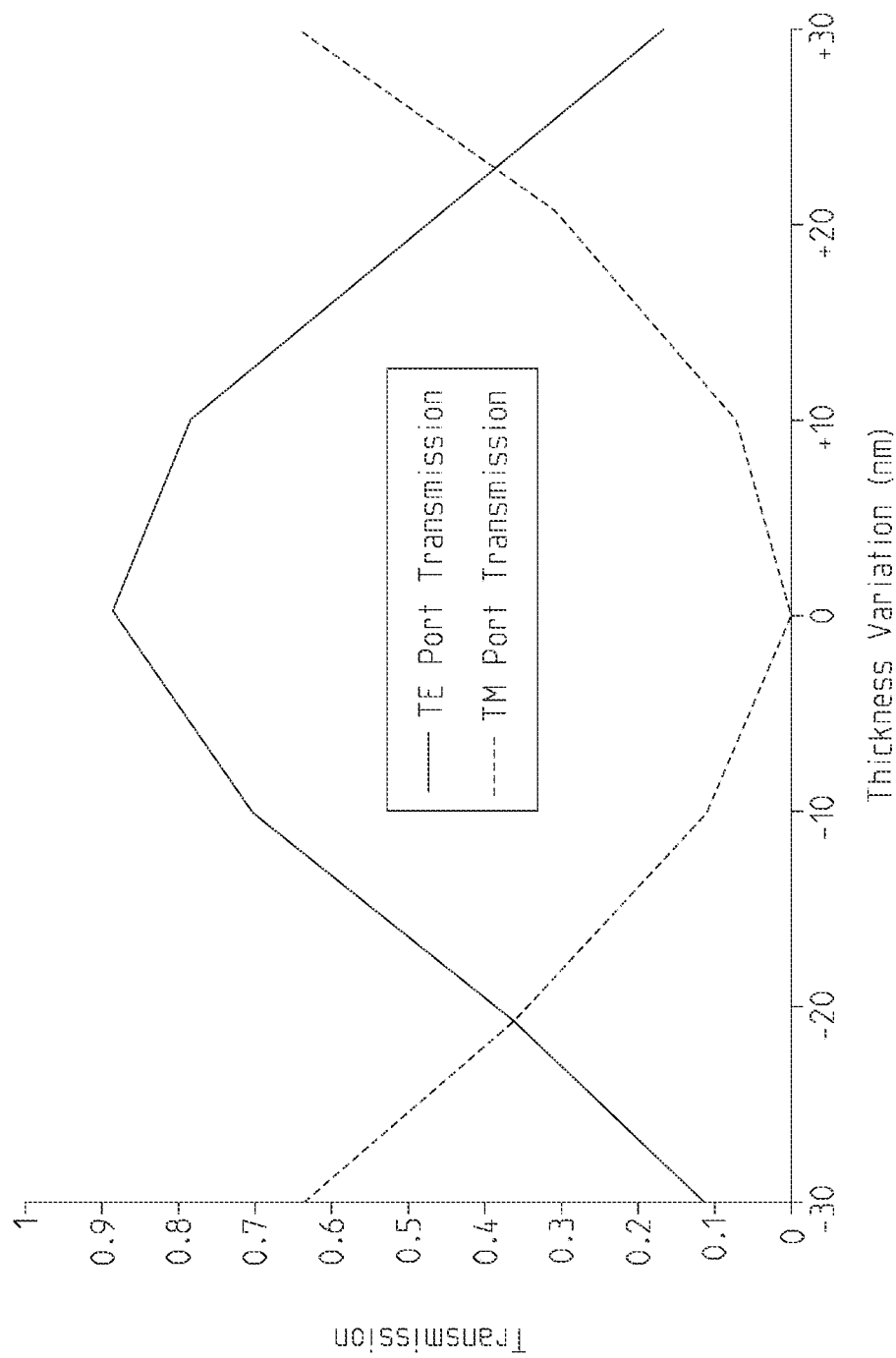

As shown by FIGS. 5A and 5B, the fabrication tolerance of the MMI polarization splitter 310 has been examined over a waveguide thickness in the range of ±10 nm and over the waveguide width range of ±30 nm. The range is chosen according to an exemplary fabrication error range. For example, FIGS. 5A and 5B show that when the waveguide thickness varies from −10 nm to +10 nm, $TM_0$ transmission varies less than 6% and $TE_0$ transmission varies less than 5%, which shows that the transmission may be tolerant. FIGS. 5C and 5D show that when the waveguide width varies from −30 nm to +30 nm, the $TM_0$ and $TE_0$ transmission may change compared to FIGS. 5A and 5B. For example, when the width variation is within ±10 nm, the $TM_0$ and $TE_0$ transmission changes less than 10% and 15% respectively. In some embodiments, this tolerance is acceptable.

Figure 6A:
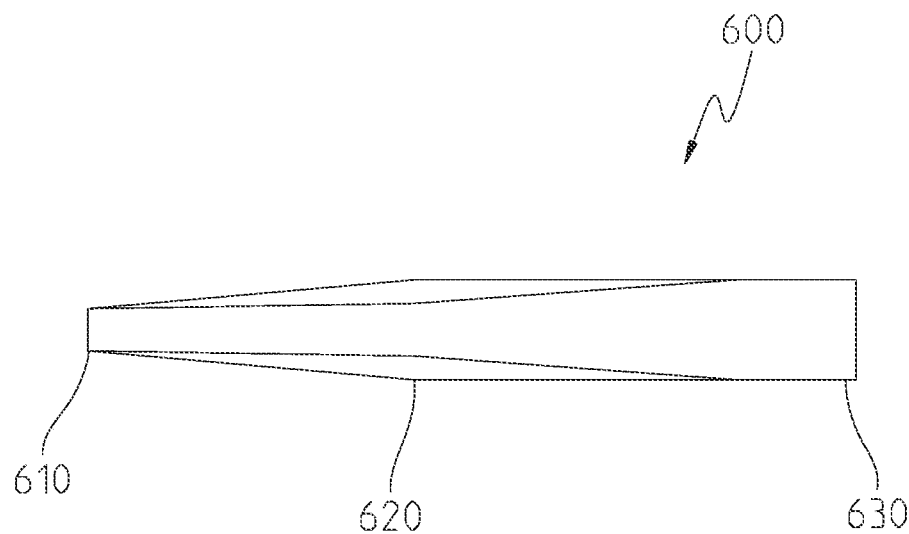
FIGS. 6A-6D show diagrams associated with a polarization converter in accordance with some embodiments of the present disclosure.

FIG. 6A shows an example structure 600 that can be used for the bi-level waveguide polarization rotator 320 shown in FIG. 3, for example, in accordance with some embodiments of the present disclosure. The structure 600 may have asymmetry where input port 610 is less wide compared to output port 630. Area 620 may reflect a rib layer of structure 600, for example.

Figure 6B:
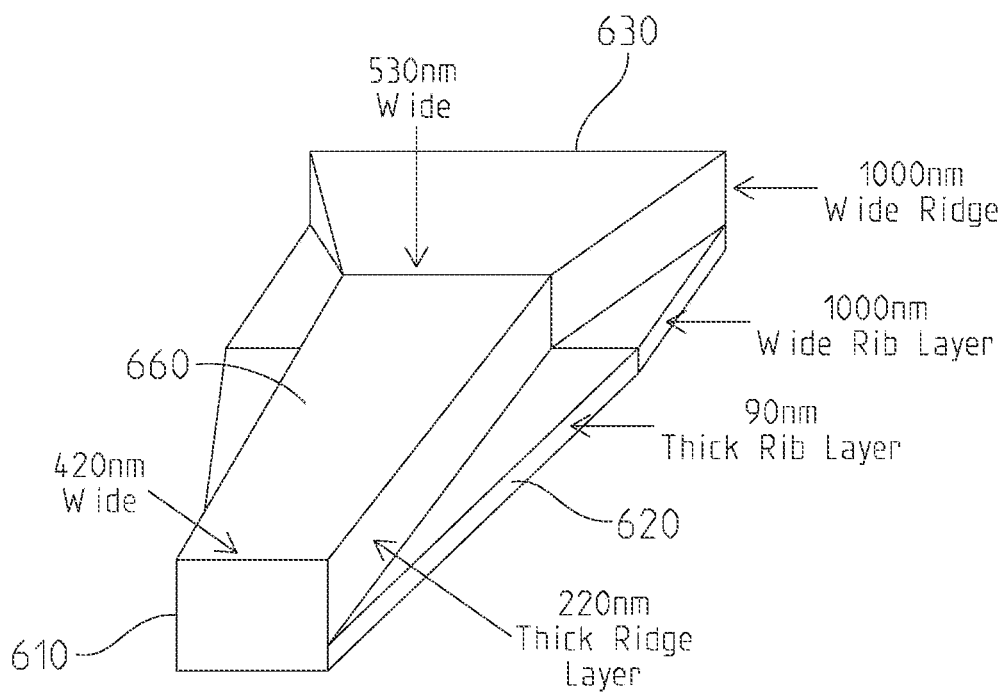

FIG. 6B shows another diagram of the exemplary structure 600 in accordance with some embodiments of the present disclosure. For example, the port 610 may be at or about 420 nm wide. The output port 630 may be at or about 1000 nm wide, for example. The structure 600 may be a double-etched structure, including a ridge layer 660, which may be silicon, and a rib layer 620, which may also be silicon. In one example case, the ridge layer 660 may be 220 nm thick. For example, rib layer 620 may be at or about 90 nm thick. For example, rib layer 620 may be at or about 420 nm wide in a first region and may taper outward, for example, as the layer proceeds toward output port 630. For example, ridge layer 660 may be at or about 420 nm wide in a first region and may taper outward to 530 nm and then 1000 nm, for example, as the layer proceeds toward output port 630. In some embodiments, both the silicon ridge layer 660 and the silicon rib layer 620 may be covered by a silicon dioxide cladding layer. In some embodiments, below the silicon ridge layer 660 and the silicon rib layer 620, there may be a BOX layer, which may be 2 μm thick, for example.

$TM_0$ mode light may be input at the input port 610. Due to vertical asymmetry, $TM_0$ mode light can have super modes at certain waveguide sections with widths in the rib layer 620. The $TM_0$ mode light can be transferred into the $TE_1$ mode light and then output at output port 630. The structure 600 may have one or more of a high conversion efficiency, 1 dB bandwidth, high fabrication tolerance, and/or compact size.

Figure 6C:
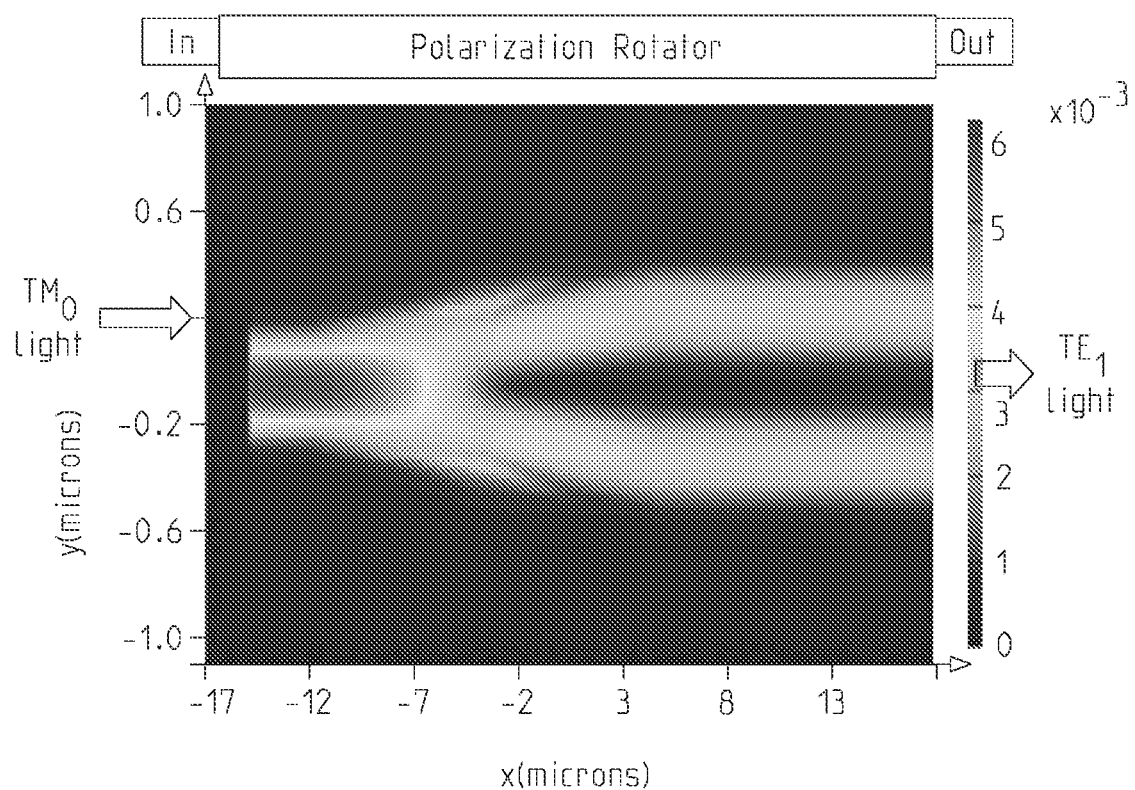
Figure 6D:
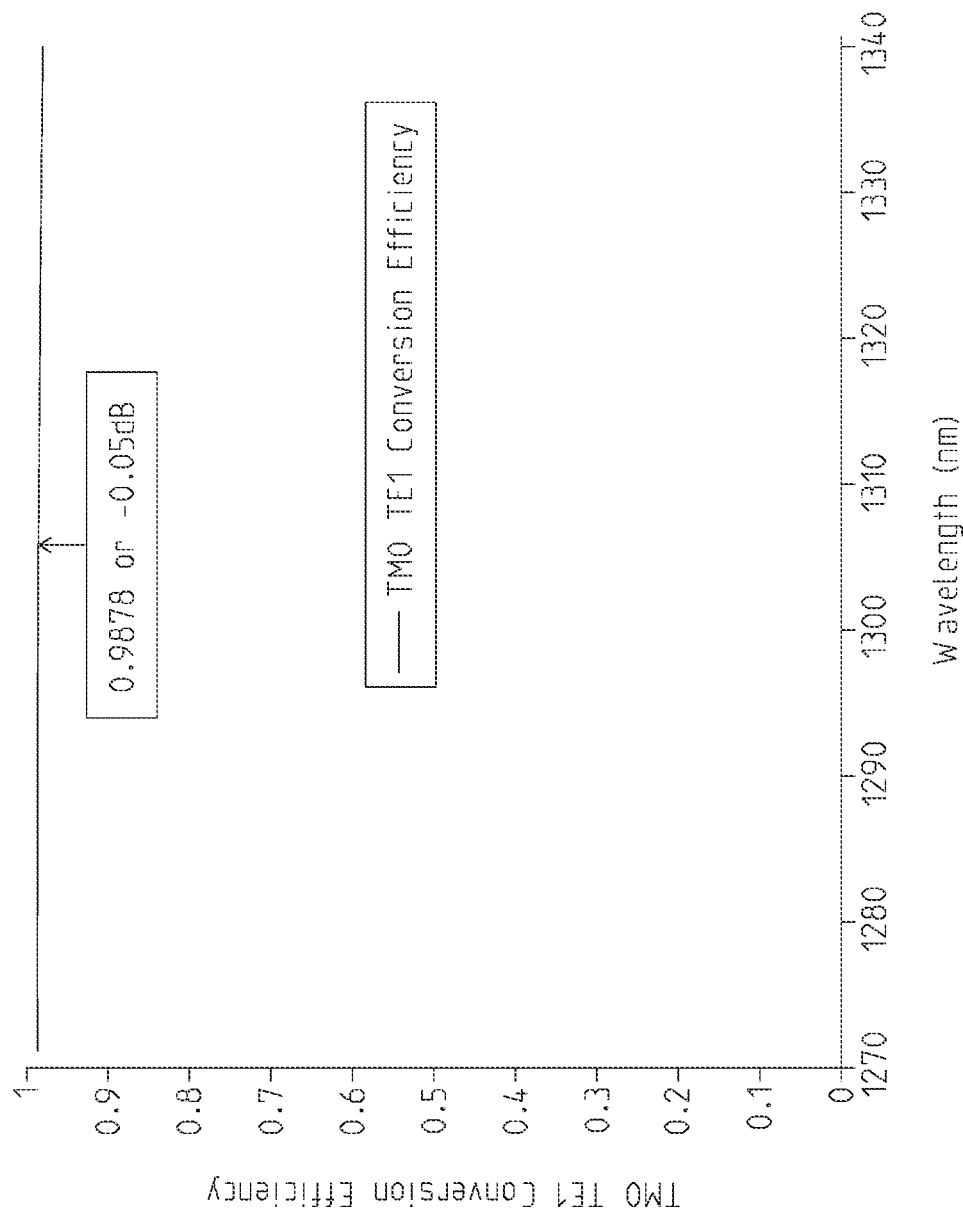

3D FDTD simulation performance of the polarization rotator 320 is shown in FIGS. 6C and 6D. As shown in FIG. 6C, $TM_0$ light is input at the left of the diagram, and was successfully transferred into two branches of the $TE_1$ mode light at the right hand side of the diagram. FIG. 6D shows the conversion efficiency of the polarization rotator 320 as 98.78%, or −0.05 dB. As shown by FIG. 6D, the wavelength response of the rotator is flat, and the 1 dB bandwidth of the polarization rotator is far larger than 70 nm. In some embodiments, the polarization rotator 320 may be sized 24 μm by 1 μm. The FIG. 6 diagrams may correspond to such a sized design.

Figure 7A:
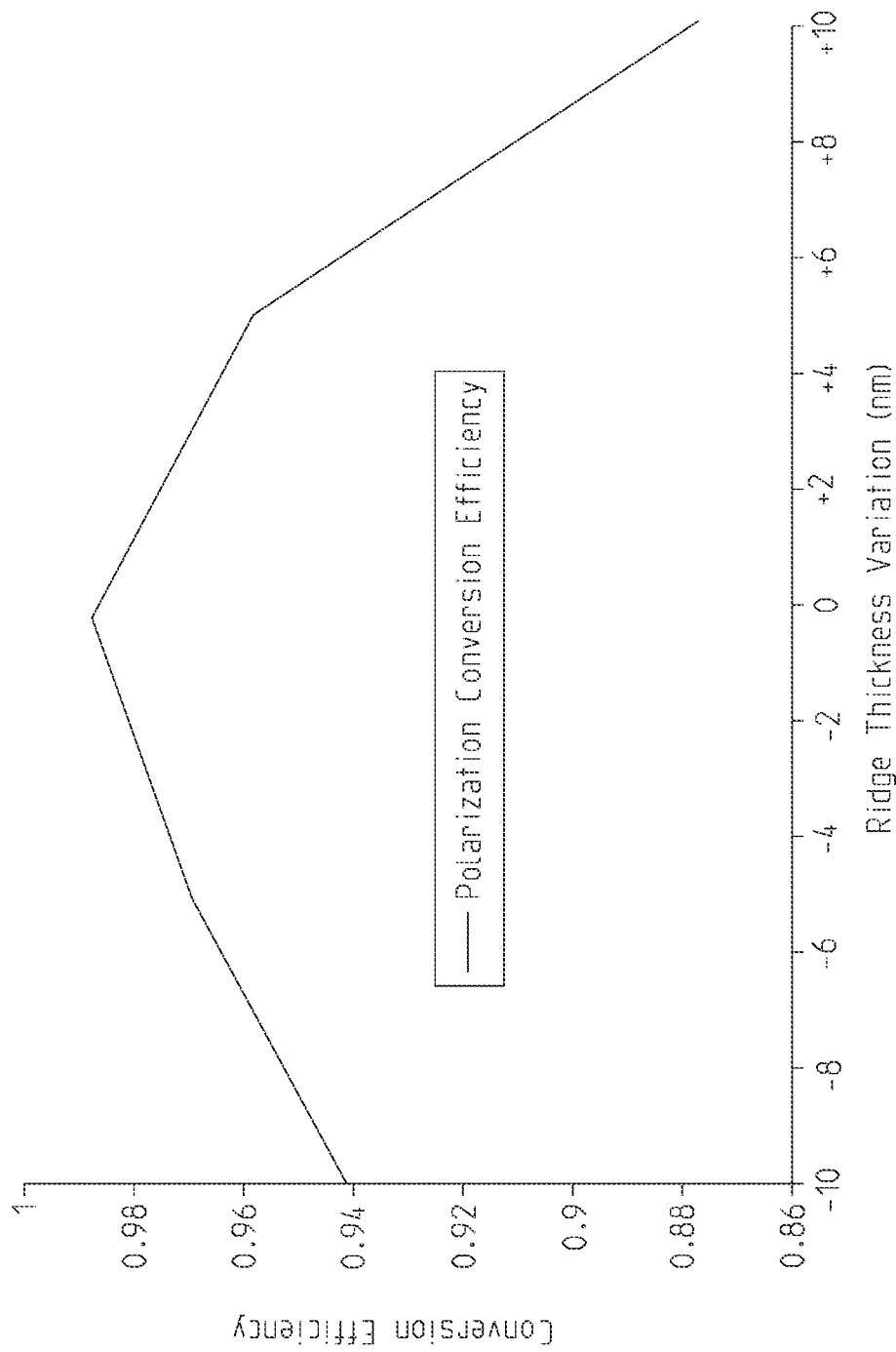
FIGS. 7A-7D show simulation diagrams of polarization tolerance in accordance with some embodiments of the present disclosure.
Figure 7B:
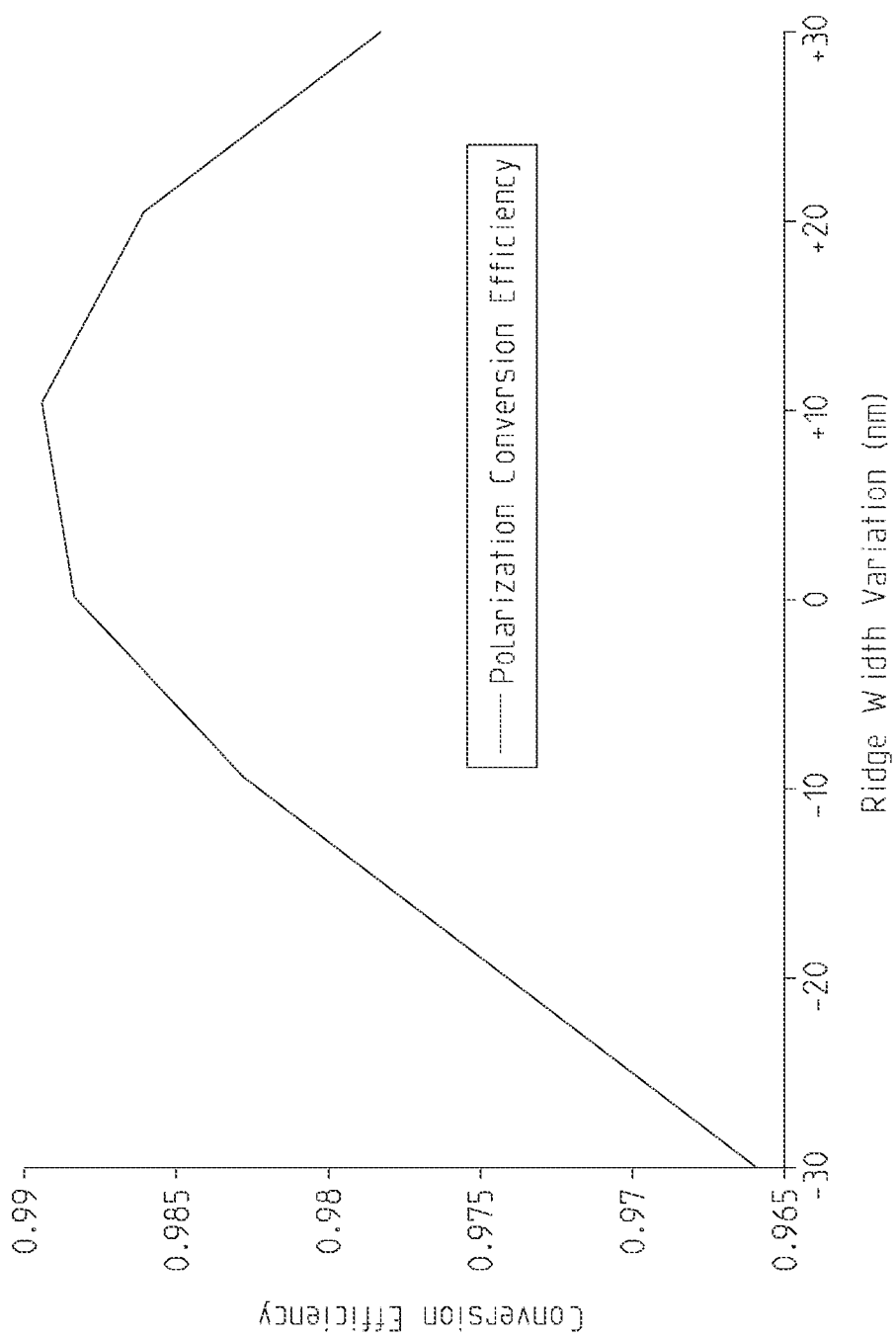
Figure 7C:
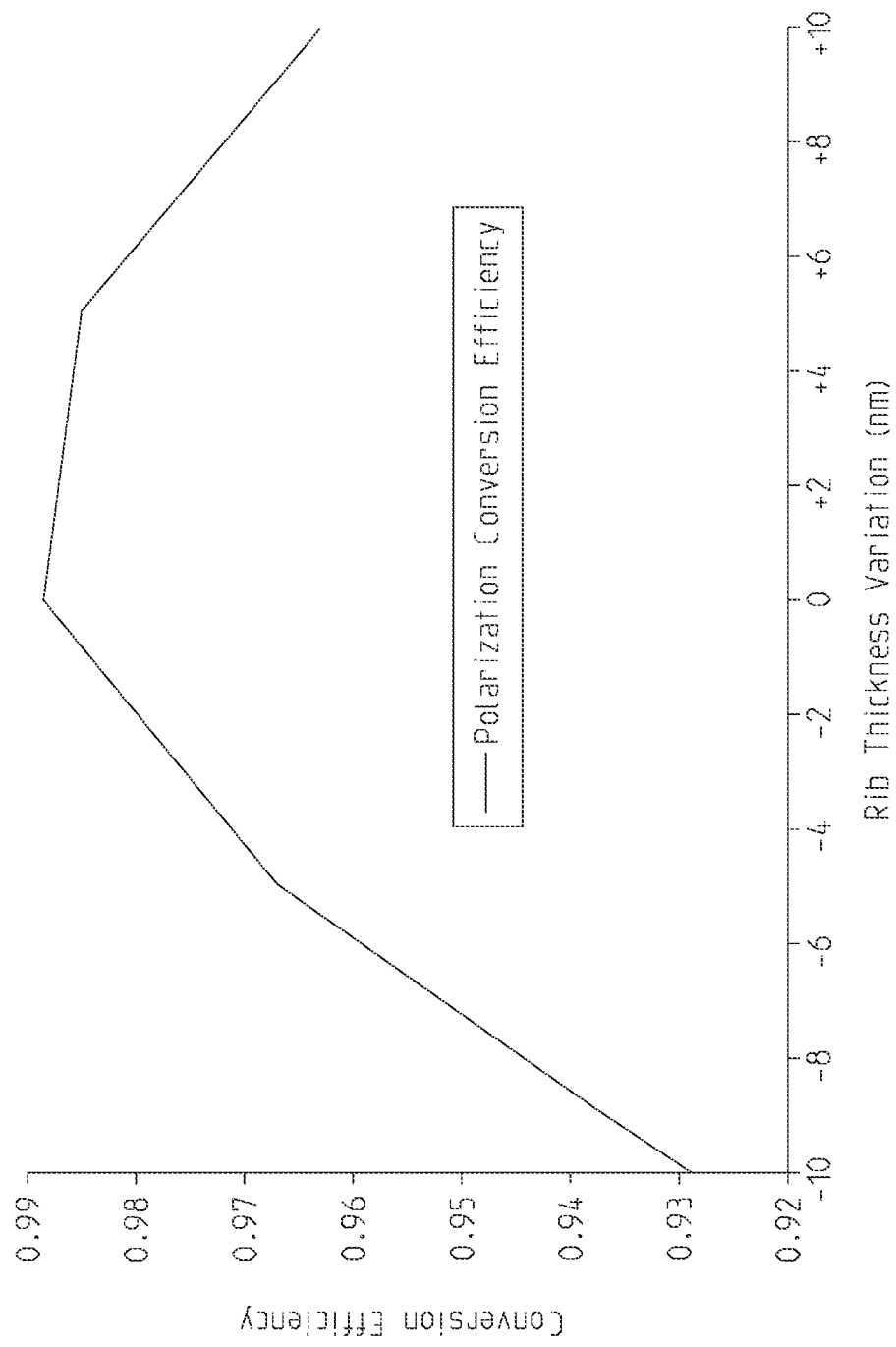
Figure 7D:
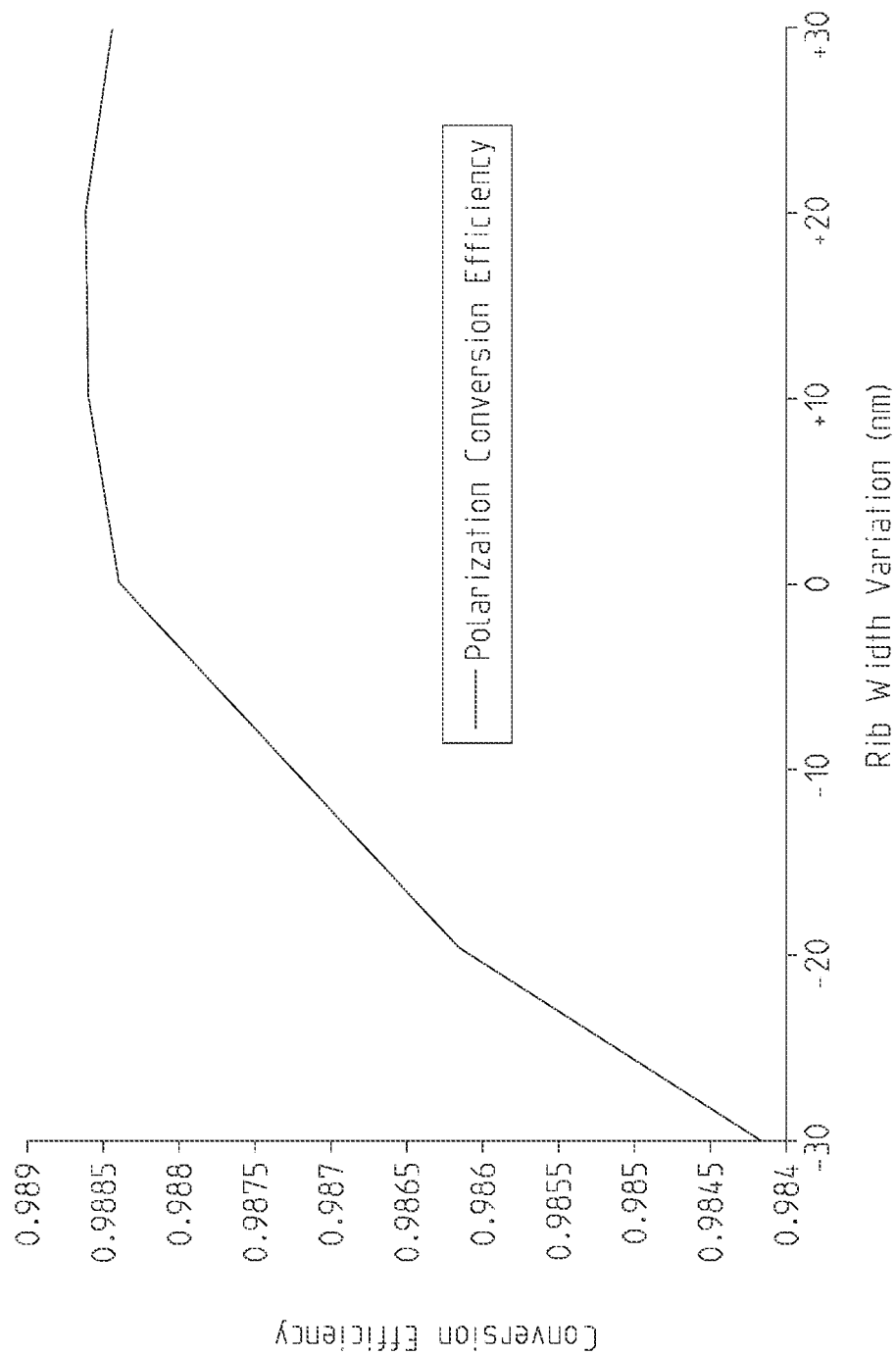

FIGS. 7A-7D show exemplary tolerance simulation diagrams of an exemplary polarization rotator 320. FIG. 7A shows that the conversion efficiency of the polarization rotator 320 may change less than 4.5% as the ridge waveguide thickness of polarization rotator 320 varies from −10 nm to +10 nm. FIG. 7B shows that conversion efficiency may change less than 3.5% as the ridge waveguide width of the polarization rotator 320 varies from −30 nm to +30 nm. FIG. 7C shows the conversion efficiency may change less than 6% as the rib waveguide thickness of the polarization rotator 320 varies from −10 nm to +10 nm. FIG. 7D shows the conversion efficiency changes less than 1% as the rib waveguide width of the polarization rotator 320 varies from −30 nm to +30 nm. Thus, the data of FIGS. 7A-7D shows that the exemplary polarization converter 320 may be highly tolerant.

Figure 8A:
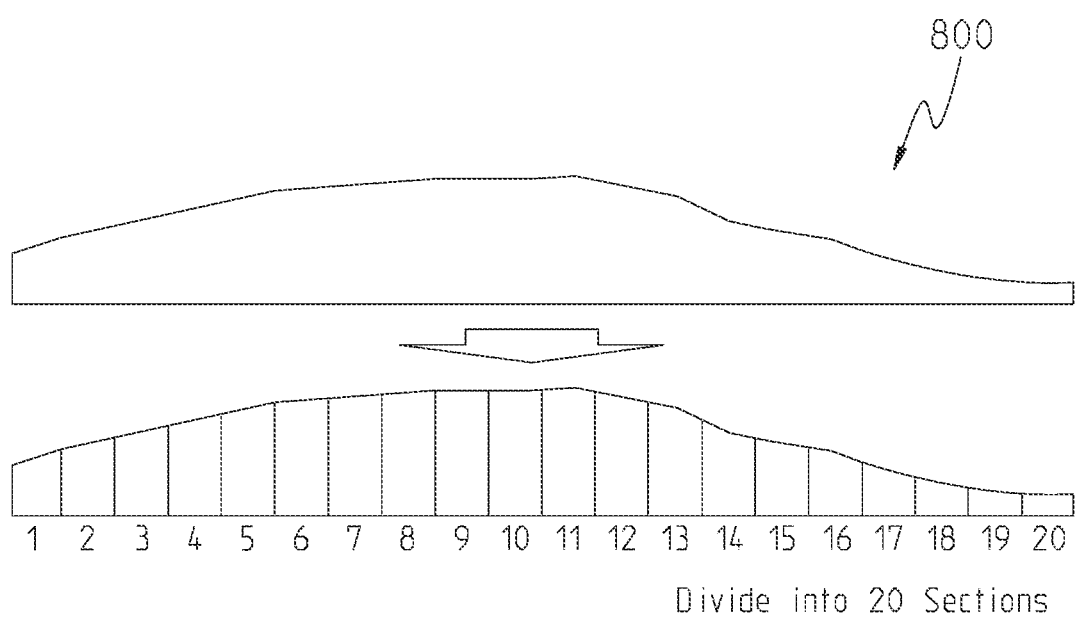
FIGS. 8A-8C show converter performance diagrams in accordance with some embodiments of the present disclosure.
Figure 8B:
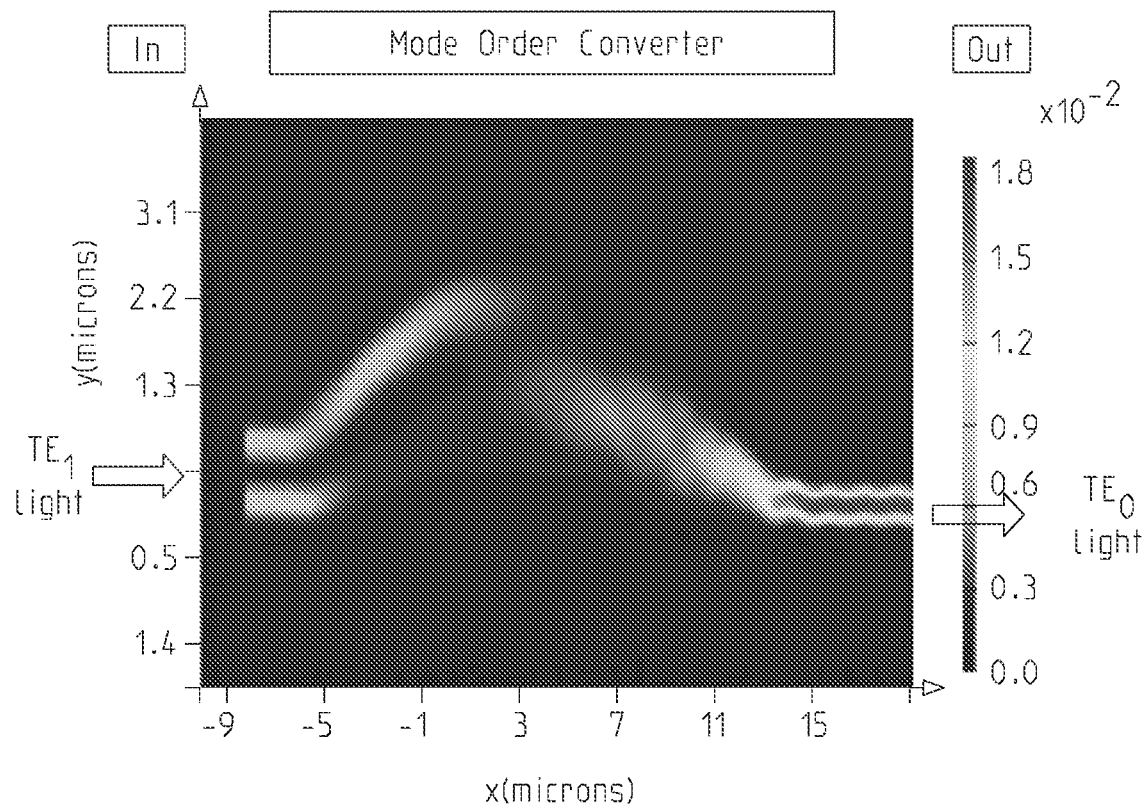
Figure 8C:
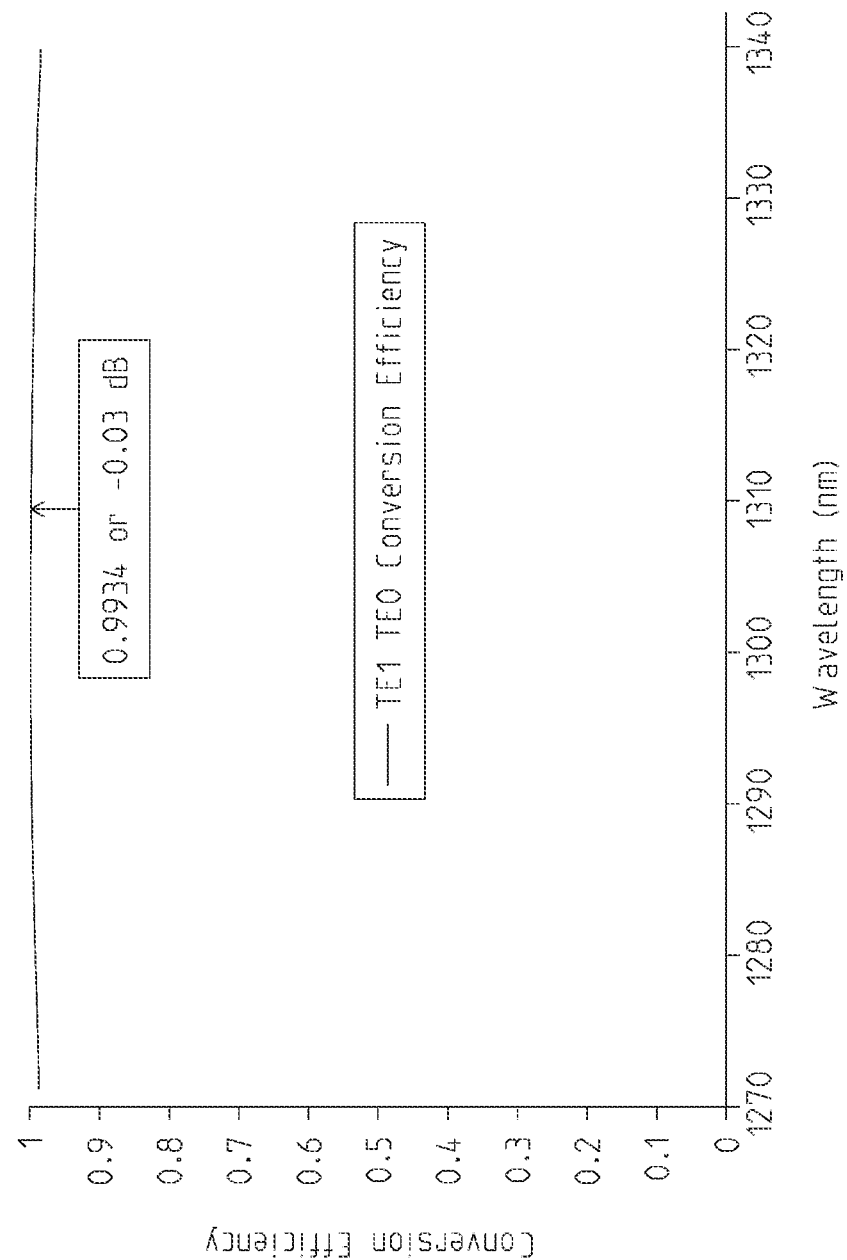

FIGS. 8A-8C show diagrams relating to a mode order converter. FIG. 8A shows an example structure 800 of an asymmetric mode converter, as an example of the asymmetric waveguide taper mode order converter 330 shown in FIG. 3. The upper edge of the mode converter is not symmetric to the lower edge along the propagation direction. Taking the middle point of the input port as a starting point and drawing a horizontal line through the example structure 800, the upper half of the mode converter is designed to be wider than the lower half. The left port of the example structure 800 can be connected to the polarization rotator to receive the $TE_1$ mode. In the asymmetric mode converter, the two lobes of the $TE_1$ mode light input into the structure 800 may have experienced different phase changes due to its shape and may be merged into a TE$_0$ mode, which is output by the structure 800.

There is no analytic equation to describe what specific shape this asymmetric mode converter should be. Tradeoffs also exist in the design of the structure 800, such as low optical loss versus flat spectrum and compact size versus high fabrication tolerance. Hence, the PSO algorithm can again be used to reach a final optimal design. The design of the structure 800 may be divided into 20 sections along the propagation direction and the width of each section is optimized with particle swarm optimization (PSO) to realize high conversion efficiency, large 1 dB bandwidth, high fabrication tolerance and compact size, as shown in FIG. 8A.

The example structure 800 of the asymmetric waveguide taper mode order converter 330, as shown in FIG. 8A, may be fabricated on a silicon layer and may be covered with silicon dioxide cladding. In one example, the silicon layer may be at or about 220 nm thick. Below the silicon layer may be a BOX layer. In one example, the BOX layer may be at or about 2 μm thick. The asymmetric layout layer is the 220 nm thick silicon rib layer. Beside the rib layer, no other silicon layer with different thickness is used.

FIG. 8B shows exemplary 3D FDTD simulation performance of the example structure 800 of the asymmetric waveguide taper mode order converter 330. As shown, at the left side of FIG. 8B, TE$_1$ mode light may be input and transferred to TE$_0$ mode light, which is at the right side of FIG. 8B. FIG. 8C shows exemplary polarization converter conversion efficiency versus wavelength. As shown, the conversion efficiency is 99.34%, or −0.03 dB. The 1 dB bandwidth of the polarization converter is far larger than 70 nm. In some embodiments, the converter 330 may be sized 21 μm×3 μm. FIGS. 8 and 9 diagrams may correspond to such a sized design.

Figure 9A:
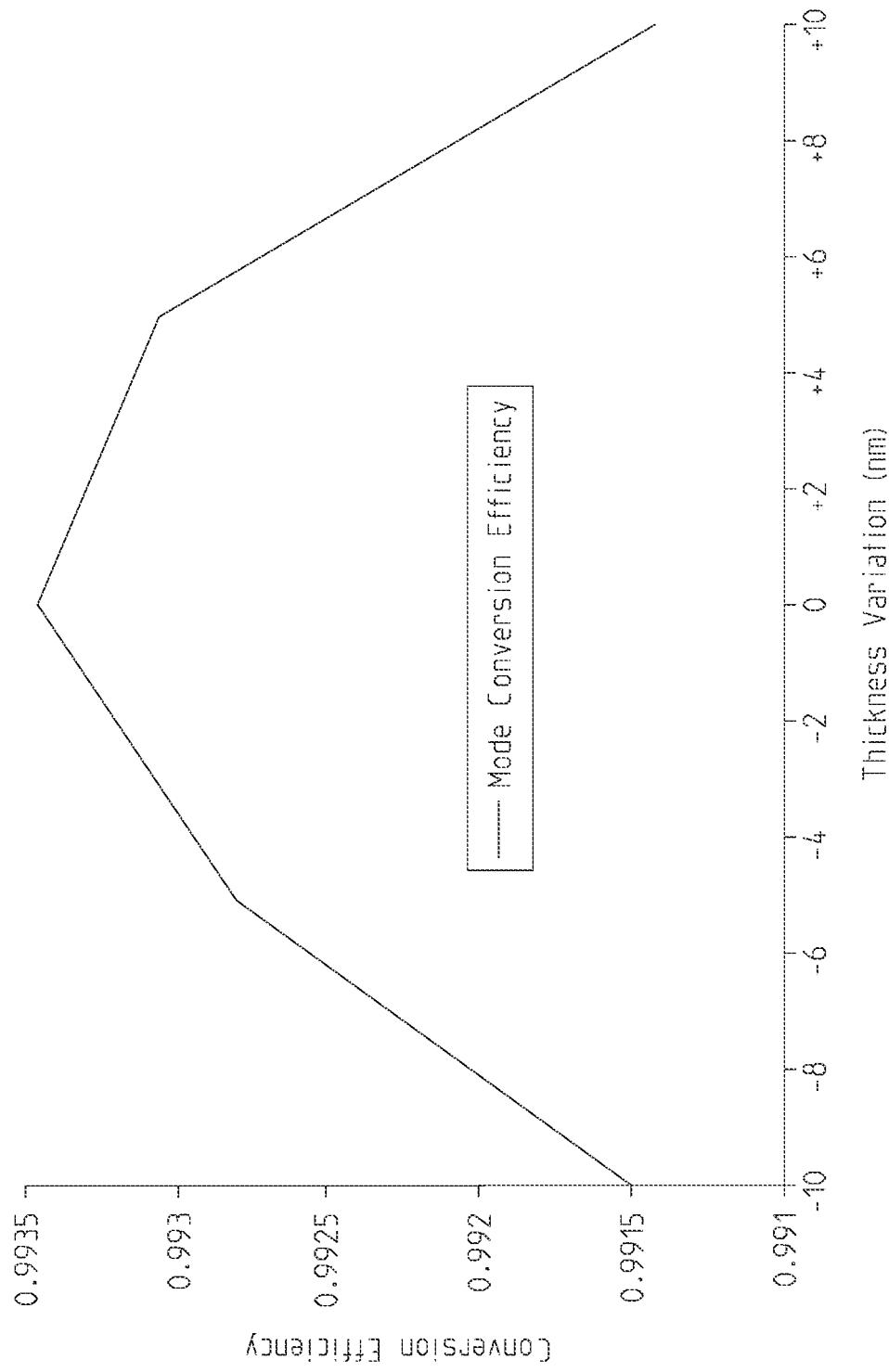
FIGS. 9A-9B show simulations of fabrication tolerance of a converter in accordance with some embodiments of the present disclosure.
Figure 9B:
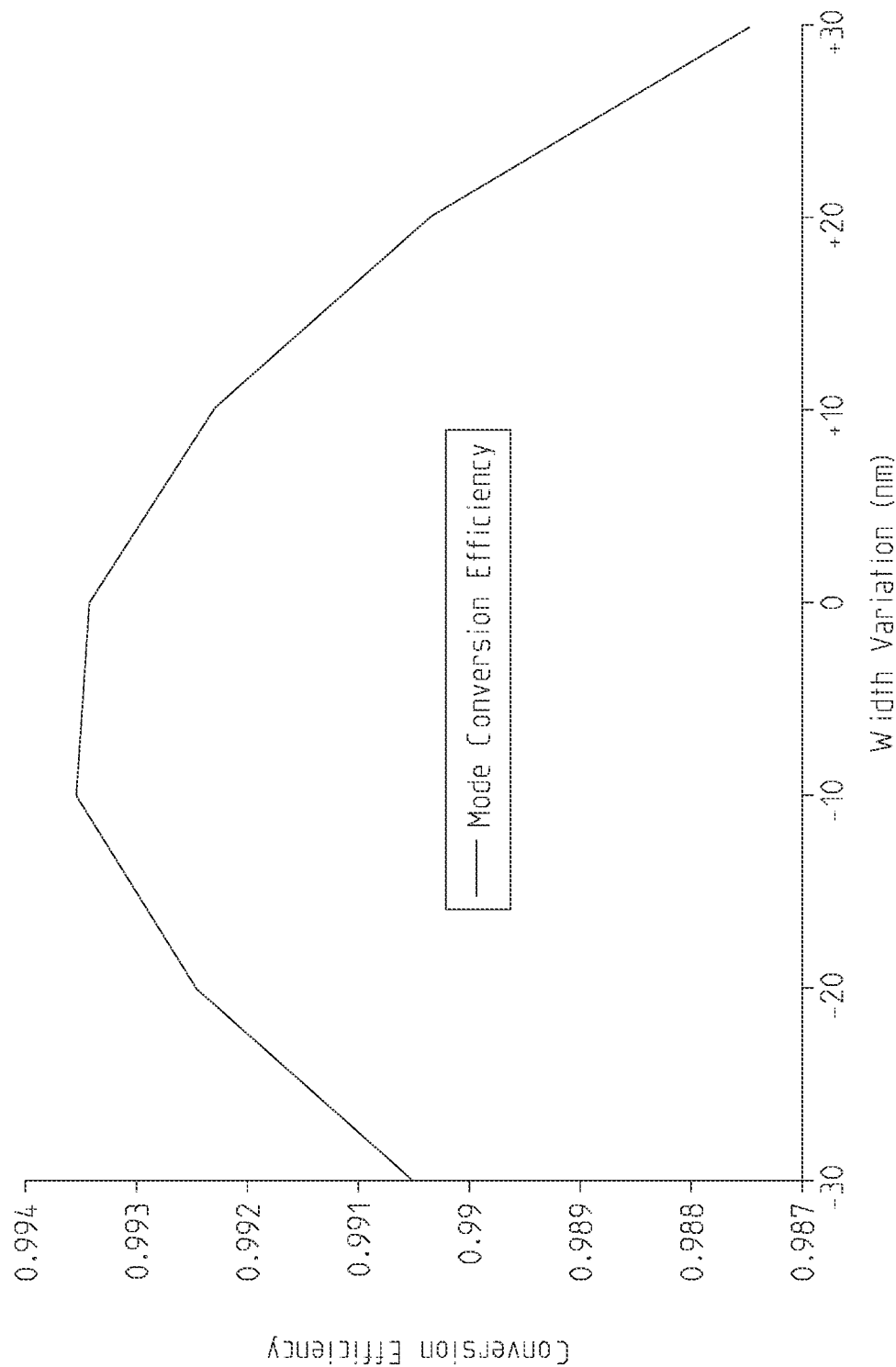

FIGS. 9A and 9B show exemplary simulated fabrication tolerance of the example structure 800 of the asymmetric waveguide taper mode order converter 330. As shown by FIG. 9A, conversion efficiency changes less than 1 percent as the waveguide thickness varies in a range of ±10 nm. Similar results may occur as the waveguide width varies within the range of ±30 nm, as indicated in FIG. 9B. These simulations therefore exhibit suitable fabrication tolerance for the structure 800.

Figure 10A:
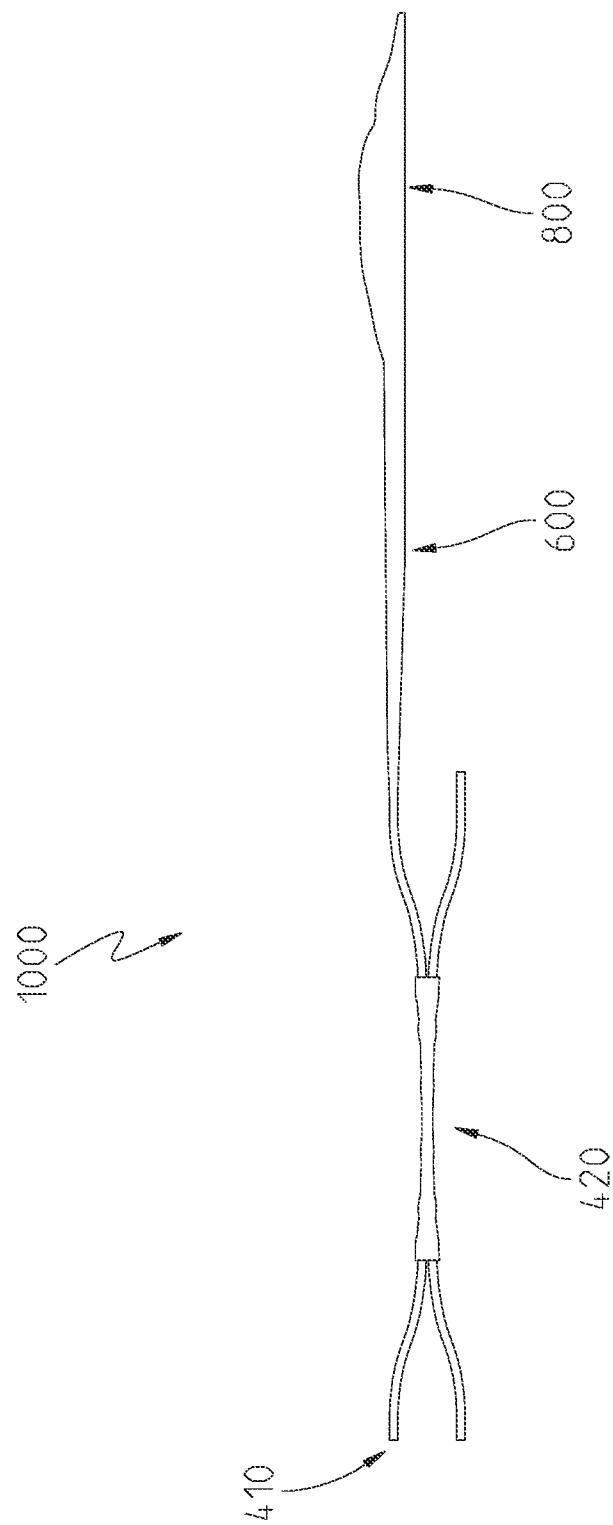

FIGS. 10A-10E show diagrams related to the simulation of the integrated optical apparatus 300 in accordance with some embodiments of the present disclosure. Performance was simulated in the wavelength range of 1270 nm to 1340 nm. FIG. 10A shows the entire structure 1000 of the integrated optical apparatus 300 shown in FIG. 3. In some embodiments, the structure 1000 can be sized at or about 89 μm by at or about 8 μm, such that it has an area of 712 μm$^2$. FIG. 10A shows the incoming light signal at the input waveguides 410 that may be an unknown mix of TE$_0$ and TM$_0$ polarized light. The MIMI polarization splitter 420 reflects the structure of splitter 310 shown in FIG. 3. Structure 600 reflects the structure of the polarization rotator 320 shown in FIG. 3. Structure 800 reflects the structure of converter 330 shown in FIG. 3.

Figure 10B:
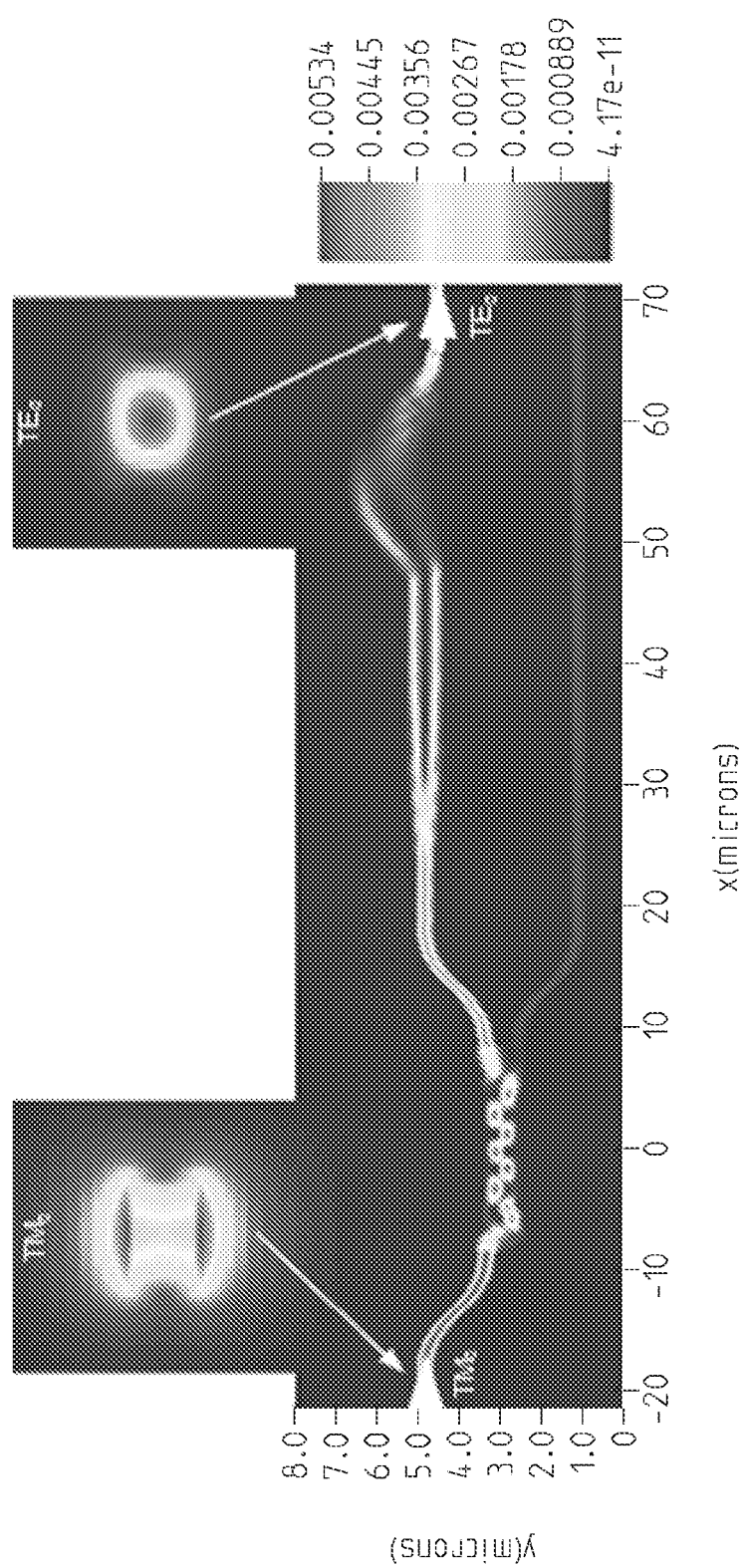
Figure 10D:
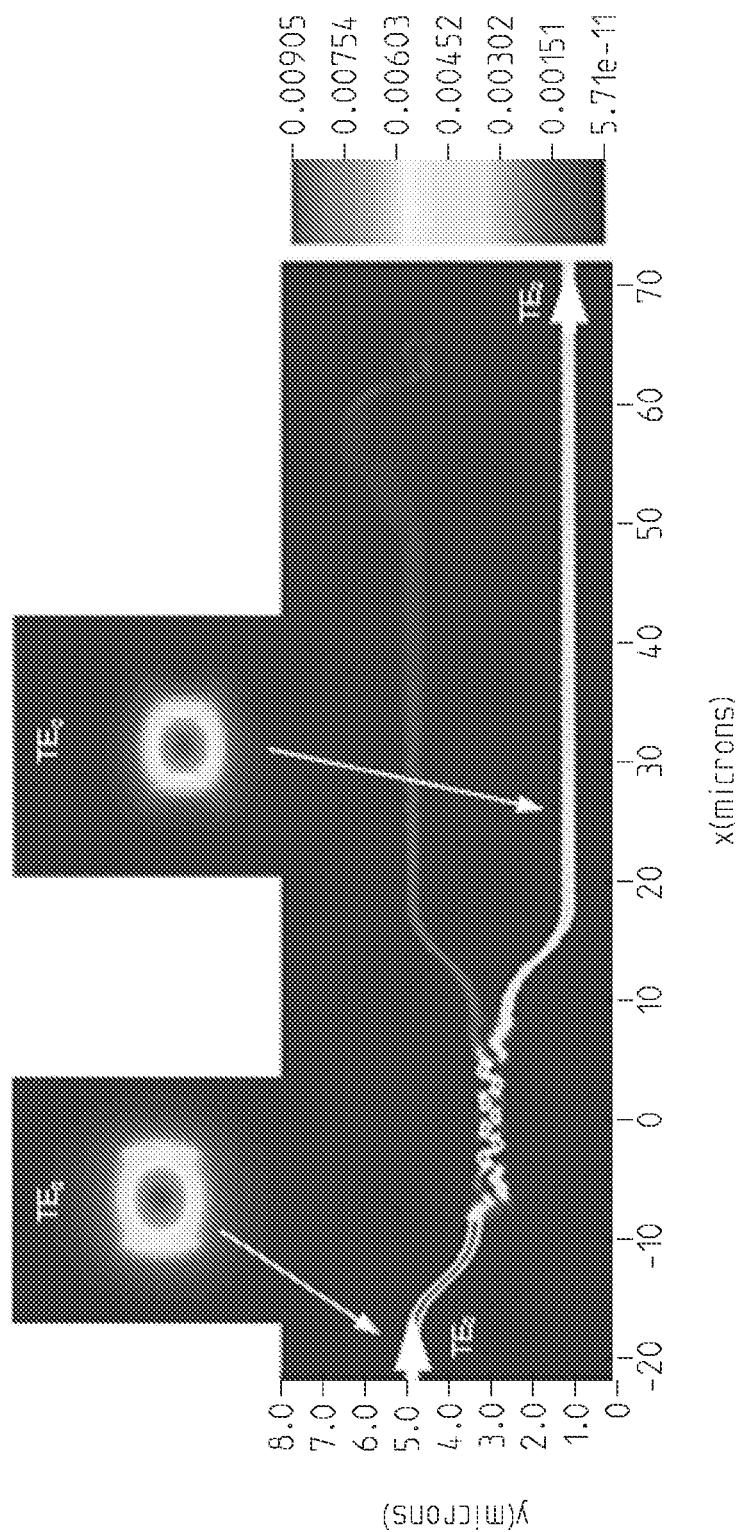
Figure 10E:
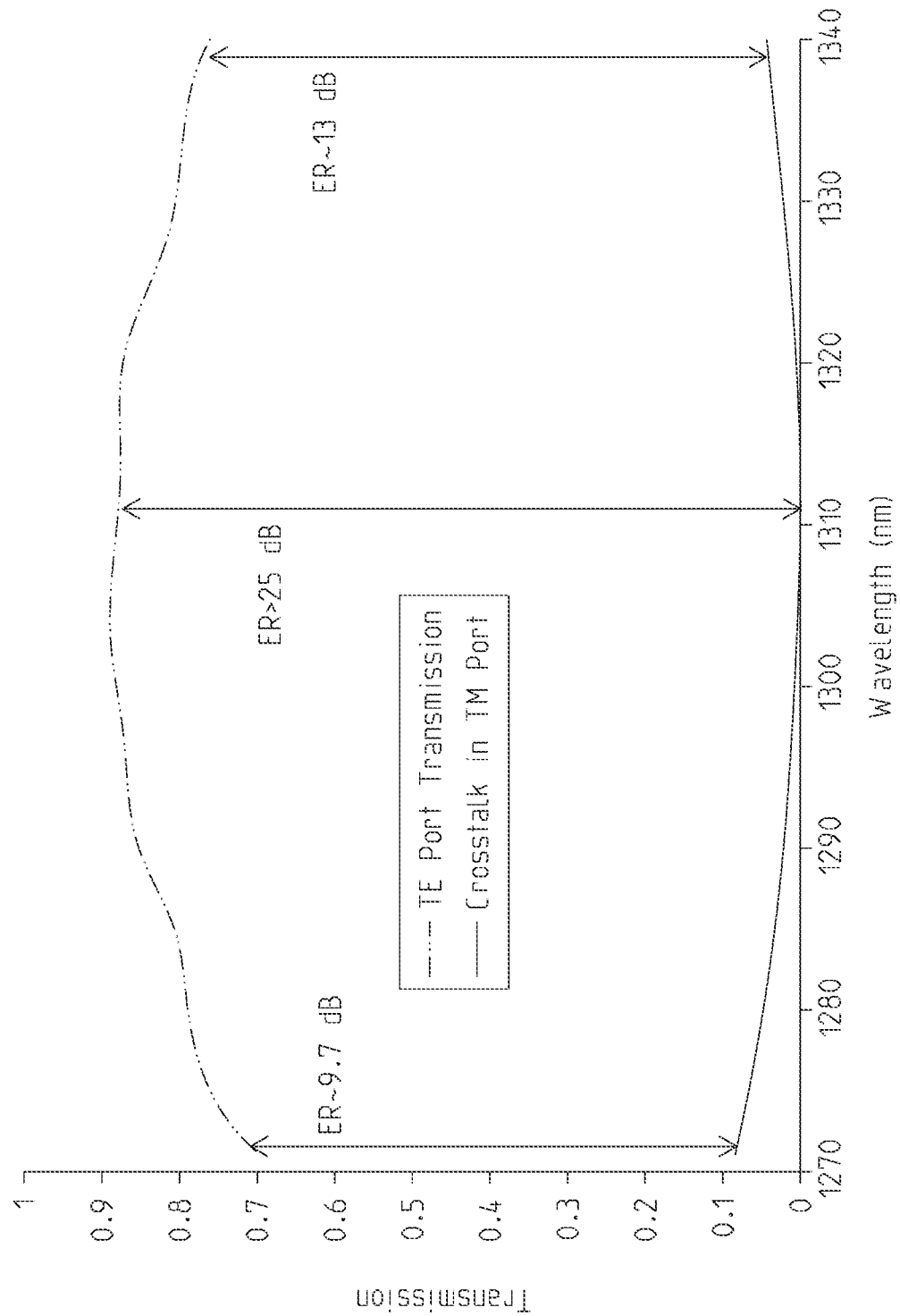

As shown by FIG. 10B, when TM$_0$ mode light is input as shown at the left of the diagram, it may be converted to TE$_0$ mode light and exported via an output port, as shown in the upper right of the diagram. For example, as shown by FIG. 10C, the conversion efficiency may be around 80 to 90% in the range of 1270 nm to 1340 nm (i.e., 0.5 to 0.9 dB). The 1 dB bandwidth is larger than 70 nm. The extinction ratio is over 25 dB at 1310 nm and may degrade to between 9 and 10 dB at the edge of the spectrum, for example. FIG. 10D shows that when TE$_0$ mode light is input as shown at the left of the diagram, it may remain as TE$_0$ mode light and is exported at an output port, as shown in the lower right of the diagram. For example, as shown by FIG. 10E, the transmission can be around 71-90% in the range of 1270 nm to 1340 nm (i.e., 0.5 to 1.4 dB). The 1 dB bandwidth is larger than 70 nm. The extinction ratio is over 25 dB at 1310 nm and can degrade to 10 dB at the edge of the spectrum.

It should be noted that the discussion thus far has focused on applicability of the PSR in FIG. 3 to receive data and process the light signal such that it can be received by a receiver. The main application of this PSR would be to build a polarization insensitive receiver or a polarization MUX transmitter.

Figure 11:
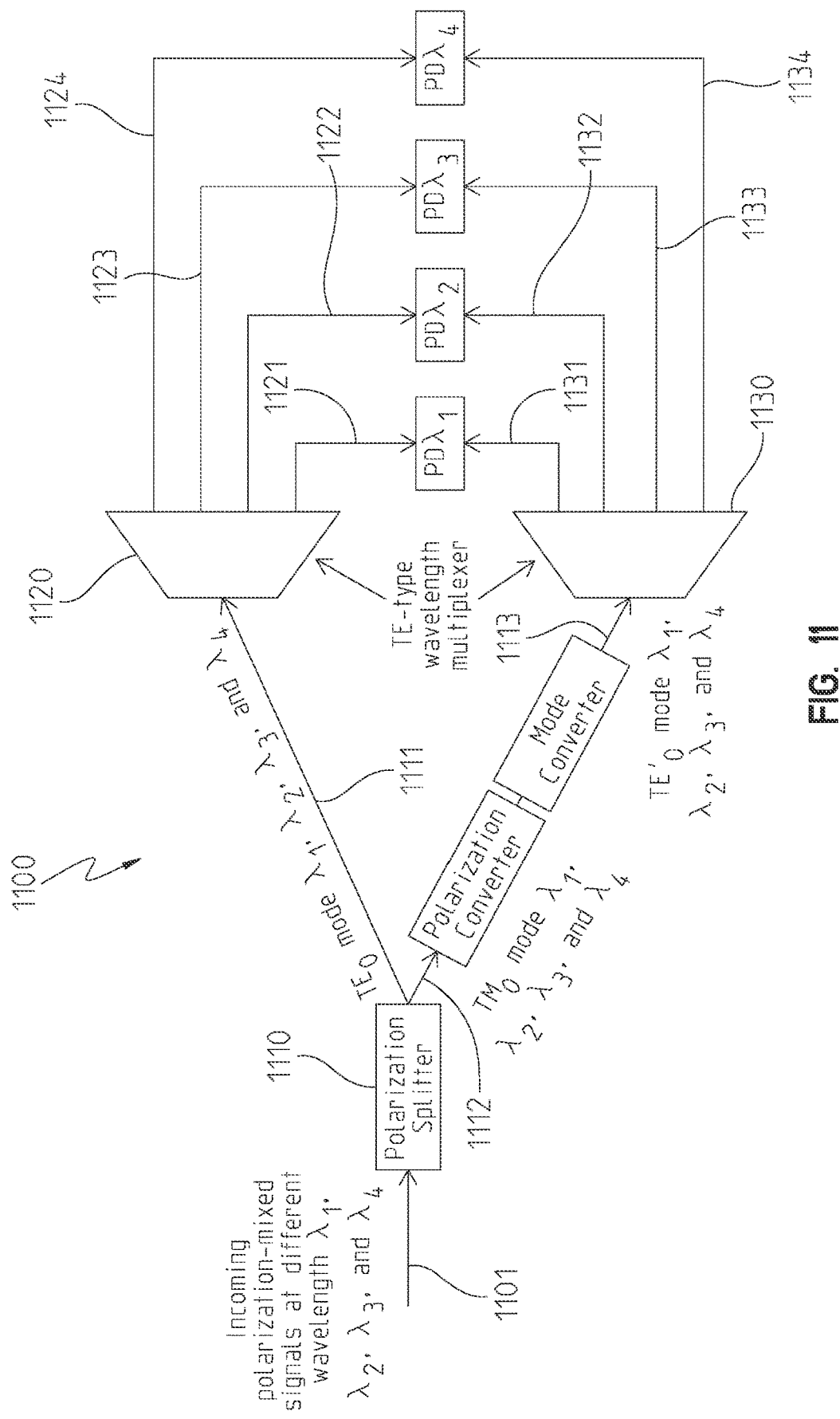
FIG. 11 shows how the presented PSR design can be applied in a polarization insensitive receiver.

FIG. 11 is a schematic diagram of an illustrative polarization insensitive WDM receiver (RX) 1100. The WDM RX 1100 includes a polarization splitter 1110, which can be embodied as the optical apparatus 300 shown in FIG. 3. As shown, the polarization splitter 1110 is used to split incoming signals 1101 with two mixed orthogonal polarization states (TE$_0$ and TM$_0$), send TE$_0$ to the TE de-MUX 1120, rotate the TM$_0$ into another TE$_0$ mode 1113 and send it to another TE de-MUX 1130. Then each signal is de-multiplexed by a 1×4 WDM de-multiplexer into separate constituent wavelength signals, having wavelengths given by $\lambda_1$, $\lambda_2$, $\lambda_3$ and $\lambda_4$, where $\lambda_1 < \lambda_2 < \lambda_3 < \lambda_4$. The various wavelength signals arrive at respective bi-directional PD. The routing waveguides 1121, 1122, 1123, and 1124 for TE$_0$ and 1131, 1132, 1133, and 1134 for TE'$_0$ (converted from TM$_0$) are carefully arranged such that the signals from both sides arrive at PD at the same timing. The power from both sides does not have to be equal. The ratio between them can be any value. The bi-directional PD collects a signal from both polarizations for each wavelength, making the entire RX system polarization insensitive. In other embodiments, numbers of discrete wavelengths other than 4 may be used. In different embodiments, using N wavelengths, where N is greater than one, the wavelengths $\lambda_i$ for $1 \leq i \leq N$ are all different from each other.

The optical apparatus 300 may also be used in a polarization-mux transmitter. This concept operates the PSR in reverse, performing the function of taking two incoming TE polarized signals (TE and TE', which are independent channels to each other) and outputting the two signals streams into a single path with two orthogonal polarization states (TE and TM). In this way, laser diodes (which are commonly TE polarized), TE waveguides, TE modulators and TE multiplexers, each built to operate only on TE polarization, can be used with the PSR to multiplex a modulated multichannel signal stream onto a single output path. The same designs for the TE destined output path can be used upstream of the PSR on the TE' destined path (then converted to TM). When used in this way, the PSR can be called a polarization rotator+combiner (PRC). To support multiple wavelengths simultaneously, the PRC can be broadband, offering good polarization extinction ratio performance and low loss over a broad wavelength range, as shown in FIG. 11

Figure 12:
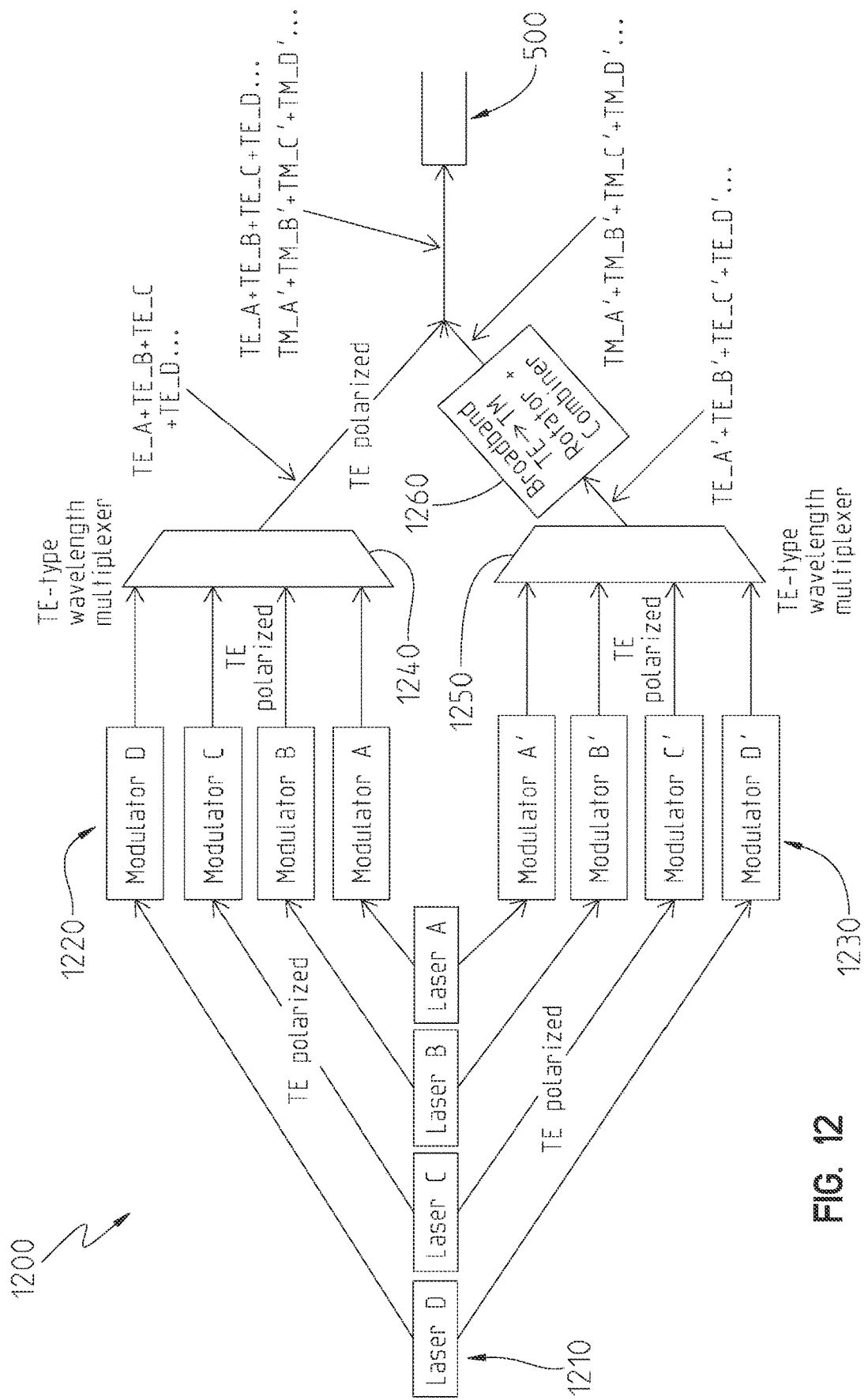
FIG. 12 shows how the presented PSR design can be applied in a polarization-mux transmitter.

FIG. 12 shows a pol-mux transmitter system 1200. For example, light may be generated by lasers 1210. Output light from light source 1210 may be splitted by a 3 dB power splitter. Half is modulated by modulators 1220 and the other half is modulated by modulators 1230. Since modulators 1220 and 1230 are driven by different RF signals, the generated signals from 1220 and 1230 are independent channels to each other. Modulated optical signals by modulator 1220 will then be multiplexed by MUX 1240. The other optical signals generated by modulator 1230 will be multiplexed by MUX 1250 and then converted to TM polarization by the polarization rotator in 1260. Then, the multiplexed TE signals at wavelength $\lambda_A$, $\lambda_B$, $\lambda_C$, $\lambda_D$ from 1240 will be combined with the TM signals at wavelength $\lambda_A$, $\lambda_B$, $\lambda_C$, $\lambda_D$ by the polarization combiner in 1260. Finally the signals of eight independent channels (TE_A/TE_B/TE_C/TE_D/TM_A/TM_B/TM_C/TM_D) will be output into the fiber system. As mentioned above, the PSR presented here is designed to be working for broadband. Hence, much more wavelength channels could be easily added and not limited to only 4 wavelengths.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

The invention claimed is:

1. A method of transmitting a plurality of optically modulated signals for output to a fiber system, the method comprising the steps of:
   providing a first laser source configured to emit light of a first wavelength having a first polarization and a second laser source configured to emit light of a second wavelength having the first polarization, the second wavelength being different than the first wavelength;
   receiving a first portion of the light emitted by the first laser source with a first modulator and a second portion of the light emitted by the first laser source with a second modulator;
   receiving a first portion of the light emitted by the second laser source with a third modulator and a second portion of the light emitted by the second laser source with a fourth modulator;
   outputting a first modulated optical signal from the first modulator, the first modulated optical signal having the first polarization;
   outputting a second modulated optical signal from the second modulator, the second modulated optical signal having the first polarization;
   outputting a third modulated optical signal from the third modulator, the third modulated optical signal having the first polarization;
   outputting a fourth modulated optical signal from the fourth modulator, the fourth modulated optical signal having the first polarization;
   multiplexing the first modulated optical signal and the third modulated optical signal to provide a first multiplexed optical signal having the first polarization;
   multiplexing the second modulated optical signal and the fourth modulated optical signal to provide a second multiplexed optical signal having the first polarization;
   altering the second multiplexed optical signal to have a second polarization, the second polarization being different from the first polarization; and
   combining the first multiplexed optical signal having the first polarization and the second multiplexed optical signal having the second polarization into a third optical signal.

2. The method of claim 1, further comprising the step of providing the third optical signal to a fiber system.

3. The method of claim 1, wherein the first laser source and the second laser source are each laser diodes.

4. The method of claim 1, wherein the step of altering the second multiplexed optical signal to have the second polarization includes the step of passing the second multiplexed optical signal having the first polarization through a waveguide polarization rotator.

5. The method of claim 1, wherein the first polarization is a TE mode polarization.

6. The method of claim 1, wherein the first polarization is a TE mode polarization and the second polarization is a TM mode polarization.

* * * * *